(12) United States Patent
Saund

(10) Patent No.: US 6,411,732 B1
(45) Date of Patent: Jun. 25, 2002

(54) METHOD FOR INTERPRETING HAND DRAWN DIAGRAMMATIC USER INTERFACE COMMANDS

(75) Inventor: Eric Saund, San Carlos, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/897,405

(22) Filed: Jul. 21, 1997

Related U.S. Application Data

(63) Continuation of application No. 08/303,929, filed on Sep. 9, 1994, now abandoned.

(51) Int. Cl.[7] ................................................. G06K 9/00
(52) U.S. Cl. .................... 382/187; 345/863; 707/541
(58) Field of Search .............................. 345/179, 863; 358/452, 453, 403; 382/175, 176, 182, 187, 188, 189, 203, 309, 311, 312–15, 179, 173, 181; 700/17, 83; 707/102, 512, 541, 516, 528

(56) References Cited

U.S. PATENT DOCUMENTS

| | | | |
|---|---|---|---|
| 3,611,291 A | | 10/1971 | Frank .................. 340/146.3 Z |
| 4,727,588 A | * | 2/1988 | Fox et al. .................... 382/198 |
| 4,821,335 A | * | 4/1989 | Yamazaki et al. .......... 382/186 |
| 5,010,500 A | | 4/1991 | Makkuni et al. ............ 364/521 |
| 5,012,521 A | * | 4/1991 | Endo et al. .................. 382/189 |
| 5,063,602 A | | 11/1991 | Peppers et al. ............... 382/32 |
| 5,201,011 A | * | 4/1993 | Bloomberg et al. ......... 382/308 |
| 5,297,216 A | * | 3/1994 | Sklarew ....................... 382/189 |
| 5,371,847 A | * | 12/1994 | Hargrove .................... 395/157 |
| 5,414,228 A | * | 5/1995 | Yamashita ................... 178/18 |

FOREIGN PATENT DOCUMENTS

| | | |
|---|---|---|
| EP | 0 546 323 A1 | 6/1993 |
| EP | 0 572 031 A1 | 12/1993 |

OTHER PUBLICATIONS

The New IEEE Standard Dictionary of Electrical and Electronics Terms, Fifth Edition, C.J. Booth Ed., p. 1168, Jan. 15, 1993.*
European Search Report for EPO counterpart Application No. 95306119.9. Jan. 23, 1997.
Hardock, G. "Design issues for line–driven text editing/annotation systems." *Proceedings of Graphics Interface* Jan. 1, 1991: pp. 77–84.
Kurtenbach, G. and W. Buxton. "Issues in combining marking and direct manipulation techniques." *Association for Computing Machinery* Nov. 11, 1991: pp. 137–144.

* cited by examiner

Primary Examiner—Jayanti K. Patel

(57) ABSTRACT

This invention discloses image analysis techniques supporting the interpretation of marks on a large drawing board for purposes of controlling a Board transcription device. In order for users to control such a transcription device by writing on the Board itself, the system recognizes certain markings and directives drawn by users in accordance with an agreed-upon format for control diagrams conveying information as to the parameters of transcription. In the embodiment herein described, nested squares, spatial region indicators, and symbolic annotation analysis area used to convey command parameters. The present invention demonstrates line drawing analysis techniques that support grouping and manipulation of symbolic tokens in a Scale-Space blackboard data structure.

28 Claims, 23 Drawing Sheets

METHOD FOR INTERPRETING HAND DRAWN DIAGRAMMATIC USER INTERFACE COMMANDS

CROSS REFERENCE TO RELATED APPLICATIONS

This application is a continuation of Application Ser. No. 08/303,929, filed Sep. 9, 1994, now abandoned.

This application is a related to U.S. patent application Ser. No. and U.S. Patent Application Serial No. both coassigned and concurrently filed, and incorporated by reference herein.

FIELD OF THE INVENTION

The present invention relates to controlling a device, particularly a computing device, through hand drawn markings on a whiteboard or blackboard device. More specifically, the invention relates to image analysis techniques for interpreting marks for purposes of controlling devices.

BACKGROUND OF THE INVENTION

In collaborative working environments, several users frequently wish to view and manipulate displayed information simultaneously. Whiteboards and Blackboards (hereafter referred to as "Boards") are widely used to maintain hand drawn textual and graphic images on a "wall-size" surface. The Board medium offers certain properties that facilitate a variety of interactive work practices: markings are large enough to be viewed by several people; markings can be edited by erasing and redrawing; the surface is immobile, so does not get lost, crumpled, torn, or blown by wind; the surface is readily erased, is completely reusable, and (practically) does not wear out. However, one drawback to using a Board is that information is not easily transferred to other media. Thus, it is not currently possible to hold a conversation with someone while maintaining a record of the conversation in text and graphics on a Board and then quickly, easily, and automatically transfer the record to paper or other portable and storable medium.

Existing methods for accomplishing this task are cumbersome, time-consuming, and inconvenient. One can simply transcribe by hand, onto paper, any or all of the text and graphics residing on the Board. This can be time-consuming, and suffers from errors due to mistakes in human reading and writing. Or, one can photograph the Board with a camera. This requires having a camera at hand, introduces the delay of developing the film, can be expensive if an "instant" camera is used, and is subject to poor quality rendition due to improper focus and exposure. A camera further usually produces an image of greatly reduced size that can be difficult to read.

Alternatively, "wall-size" sheets of paper, such as poster pads, lead to a relatively permanent and portable record of what was written, but these sheets of paper are large and cumbersome, and do not permit erasure during image creation.

A copy-board device provides a writing surface which can be transcribed into paper hardcopy, but these are currently conceived as conspicuous portable whiteboards that displace rather than leverage existing, built-in Boards.

The solutions discussed above further do not aid in transferring the image from the Board into an electronically usable form.

Concurrently filed U.S. patent application Ser. No. (Attorney Docket No. D/94266) offers motivations and specific technical details for a device to transcribe marks on a Board into electronic form. In summary, a video camera is mounted on a pan/tilt head. High resolution tiles are obtained by zooming in the camera on patches of the image. These are later pieced together to form a full size high resolution composite image. Perspective distortion, effects of uneven lighting, and tile overlap are handled by image processing operations.

Such a transcription device is useful because an electronic version of a Board image provides variety and flexibility in the further use of the image data. For example, an electronic image can be hardcopied, transmitted by fax, stored to a file, transferred to an electronic workstation, or projected onto a screen. Moreover, prior to any of these operations the image itself may be processed, for example select out just a region of the image, to select just certain colors, to enhance or rectify the line work, to reorder items in a list, and so forth.

The wealth of operations made available by the fundamental ability to transcribe a Board image raises the issue of control: How is the user to specify operations to be done, and when?

Since the Board transcription and image processing operations are computer-based, one possibility is for users to retire to their computers in order to control these functions. This solution is undesirable for several reasons. First, it forces users to break the cadence of their work at the Board in order to address a computer console. Second, either a console must be provided at the Board location, or else users must travel some indeterminate distance to where one is available. Third, many Board users are likely to be unfamiliar and/or uncomfortable either with computers in general, or else with the particular keyboard and mouse commands necessary to operate the program.

A second type of user interface consists of a dedicated control panel mounted adjacent to the Board. If the control panel consists of labeled buttons, these can be associated with a modest set of possible operations such as directing the transcribed bitmap to one of a handful of printers or file directories. Greater flexibility would be obtained by including a keyboard with the control panel, but this begins to present a daunting edifice to novice users. Nonetheless, for some incarnations of a Board transcription device a dedicated control panel is probably appropriate.

In the system of the present invention, however, a third alternative exists which is in several ways ideally suited for seamless creation, capture, and electronically mediated use of images originating on a whiteboard. The user interface is to consist of marks drawn by the user on the Board itself. For example, in the simplest case the user might draw a special "button" symbol, and then draw a check mark inside when the button is to be "pressed." The system, knowledgeable about buttons, would act upon the data based on the button press. Enhanced functionality may be achieved by annotating the button symbol with further directives, or by specifying different kinds of button for different operations.

The previously described interface does not eliminate the need for users to possess knowledge of how to communicate with the system in this diagrammatic fashion, but this knowledge may be more accessible and more easily assimilated by many Board users than any control panel or computer console based interface.

A diagrammatic interface exploits the user's existing skills in drawing on the Board, and furthermore can offer extremely simple access to basic functionality and introduce incrementally the greater diagrammatic complexity required to fine tune greater functionality. Finally, a diagrammatic interface consisting of marks drawn on the Board itself is best suited to providing spatial control directives, such as to extract a region of the image.

A diagrammatic user interface to a Board transcription system hinges on the ability of a computer program successfully to interpret marks on the Board. An additional advantage of the present invention includes tolerance to variability and spurious marks made by a human user.

Relatively crude yet effective basic functionality can be had by the application of very simple image processing techniques. The "BrightBoard" system, described in "Controlling Computers by Video" by Quentin Stafford-Fraser of EuroPARC, employs a video camera pointed at a fixed position on the board. User-experts execute a graphical program at a computer console to denote special regions of the board to serve as "sensitive locations," which are typically the interiors of buttons drawn on the board. Functionality is associated with sensitive regions at setup time. Then, in operation, a simple routine runs continuously to measure the net pixel lightness of the sensitive region, which is assumed to cross a threshold when a dark enough mark is made within it.

The image analysis techniques used in the BrightBoard system provides a basic level of control via marks on the Board, depending on the number of sensitive regions one wishes to define. However there are several drawbacks. First, the sensitive regions must be set up in advance and this Board space reserved for the system until the setup configuration is modified. Second, the functionality associated with simple button toggle is limited. Third, the detection of button presses by a change in lightness in sensitive regions is susceptible to false positives caused by shadows or changes in room lighting, and to false negatives due to thinly drawn and lightly colored marks.

There is therefore need for greater sophistication in the image analysis supporting a diagrammatic user interface to a whiteboard transcription system. The power of the interface can be greatly enhanced by the application of computer vision techniques in the geometric analysis of the marks on the Board. Users should be able to draw buttons on the Board anywhere and at any time, they should be able to press buttons by making "X" or check marks in them, and they should be able to make more complex diagrams to control symbolic and geometric functionality such as specifying which printer to hardcopy to, or the region of a Board to be extracted.

Diagrammatic user interface interpretation is a difficult computer vision problem because of the wide range of variation found in meaningful hand drawn commands. Symbols and text can occur in any location and at any spatial scale (size), ostensibly straight lines seldom are truly straight, supposedly continuous lines have spurious gaps and branches, and the conventions of formal geometry (such as that a square consists of two sets of parallel line segments meeting at four 90 degree corners) are seldom obeyed. Existing computer vision and document image analysis techniques perform inadequately on the Board diagrammatic user interface analysis task under normal operational conditions in which users are not likely to be especially careful about the precision and accuracy of their diagrammatic command drawings. In addition, because of the real time nature of this task, the image analysis techniques must be inherently efficient in complexity (such as avoiding combinatoric complexity in the number of marks on the board).

The present invention describes a novel application of computer vision techniques supporting interpretation of hand drawn commands under an open-ended class of diagrammatic user interface designs. The components of these interface designs may include special hand drawn symbols, and curvilinear connectives. Accordingly, the techniques of this invention support recognition of hand drawn command symbols, and tracing of curvilinear connectives. The techniques offered herein further lead to a greater degree of robustness in the machine interpretation of hand drawn diagrams than has previously been demonstrated in the art.

SUMMARY OF THE INVENTION

The present invention provides a method for controlling devices by interpreting hand drawn marks on a scanned surface. The method includes determining a hand drawn symbolic token representing an action, determining when the symbolic token is selected, and performing the action when it is selected. The method further provides for indicating a spatial area of the scanned surface associated the symbolic token, and for performing the action with respect to that spatial area.

One object of this invention is to provide human users with the ability to control computing devices and transcription devices through hand drawn images on a Board. These images may be drawn at any location on the Board, at any time, and provide a method for selecting control operations from the Board. Symbolic tokens are based upon geometric symbols that may be easily hand drawn and detected by spatial and symbolic analysis procedures.

A further object of the invention is to provide recognition of control diagrams in hand drawn images, and to provide a method for controlling symbolic and geometric functionality to the Board user.

The following description, the drawings and the claims further set forth these and other objects, features and advantages of the invention.

DETAILED DESCRIPTION

A. Conceptual Framework

The following conceptual framework is helpful in understanding the broad scope of the invention, and the terms defined below have the meanings indicated throughout this application, including the claims. This conceptual framework is a modification and extension of that set forth in the following copending, coassigned U.S. patent application, incorporated herein by reference: U.S. patent application Serial No. (Attorney Docket No. D/94266).

B. General System Description

Figure 1:
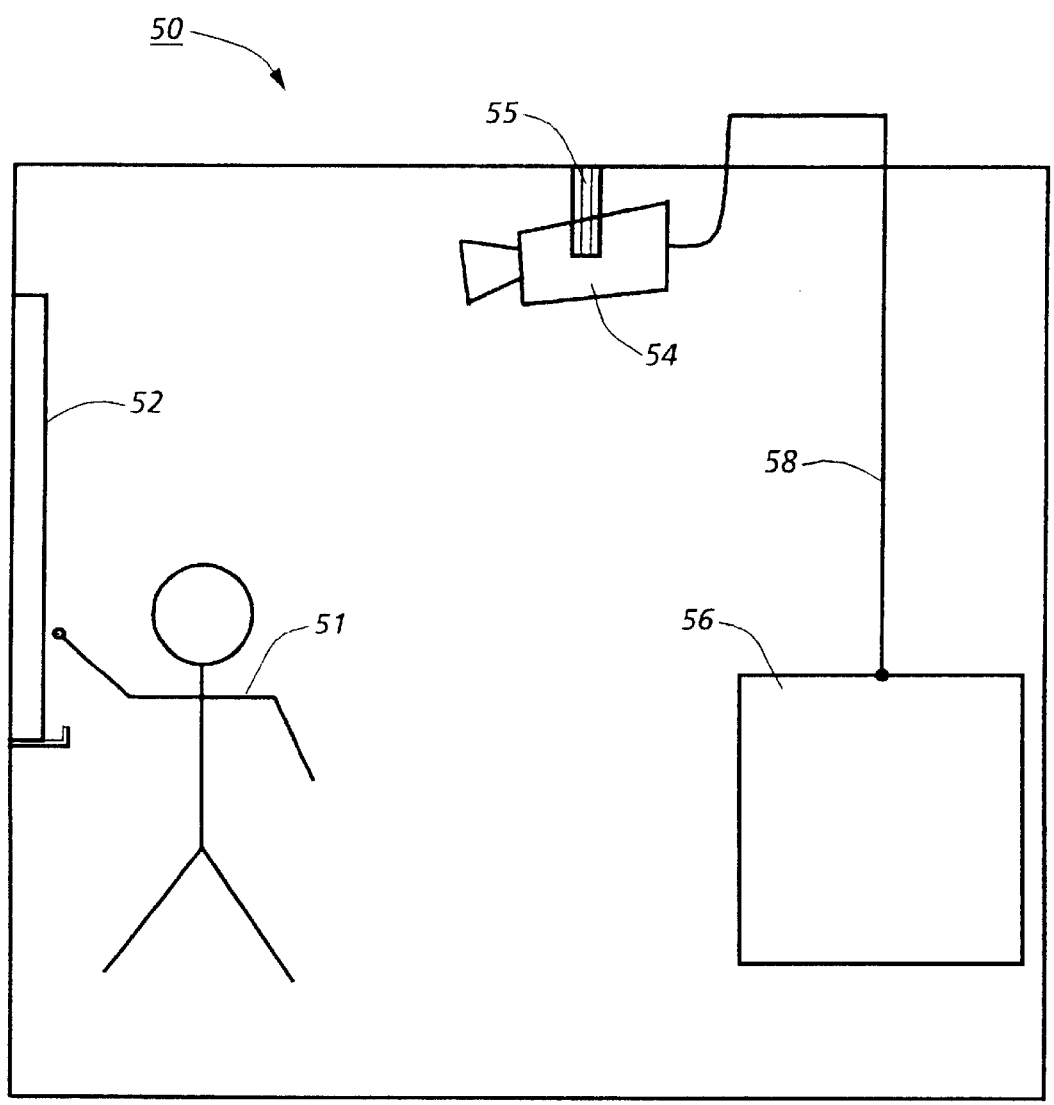
FIG. 1 shows a general surface scanning system.

FIG. 1 shows a general Board scanning system 50 in which the techniques of the present invention may be employed. It will be clear that the techniques herein described may further be applied to other types of systems, as well. For example, the techniques described may be used to interpret control commands via marks on paper in a paper-based user interface. The techniques may also be used as command entry interface for pen-based computing systems. The discussion herein, however, will be primarily described in terms of the Board scanning system described below.

Figure 2:
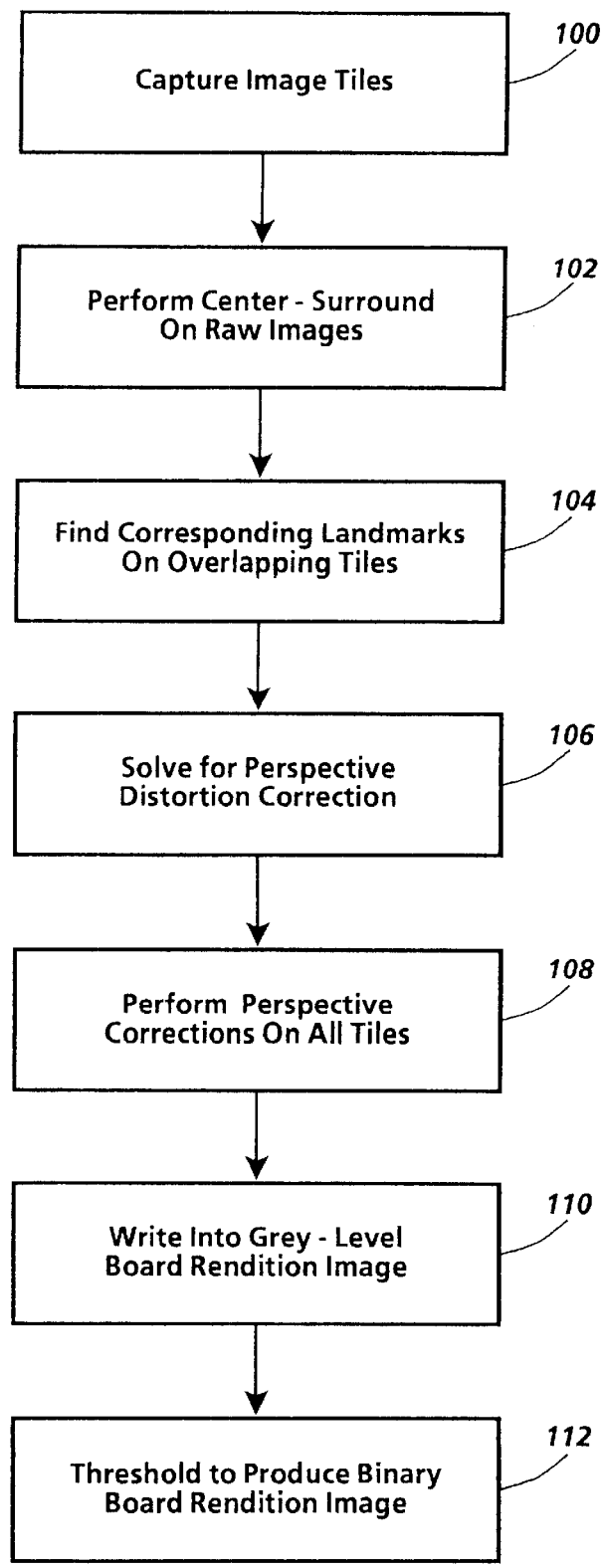
FIG. 2 is a flowchart which shows a general method for producing a binary rendition of a Board from a set of scanned image sections.

More detail describing the features and operation of the system in FIGS. 1 and 2 may be found in copending, coassigned U.S. patent application Ser. No. (Attorney Docket No. D/94266), previously incorporated.

A board 52 accepts markings from a user 51. Camera subsystem 54 captures an image or images of the Board, which are fed to computer 56 via a network 58. In general, the resolution of an electronic camera such as a video camera will be insufficient to capture an entire Board image with enough detail to discern the markings on the Board clearly. Therefore, several zoomed-in images of smaller subregions of the Board, called "image tiles," must be captured independently, and then pieced together.

Camera subsystem 54 is mounted on a computer-controlled pan/tilt head 55, and directed sequentially at various subregions, under program control, when an image capture command is executed. Camera subsystem 54 may alternately comprise an array of fixed cameras, each directed at a different subregion or subregions. For the discussion herein, camera subsystem 54 may be referred to as simply camera 54.

The "raw" image tiles will in general overlap one another, contain perspective distortion due to the off-axis viewpoint of the camera, and contain uneven lightness levels across the board between foreground (written marks) and background (unmarked board) due to uncontrolled lighting conditions and reflections. The flowchart of FIG. 2 shows a general method for producing a binary rendition of the Board from a set of scanned image sections, including compensation for the above described effects. In step 100, the scanned image sections are captured as "tiles." Each tile is a portion of the Board image scanned by a camera, such as camera 54. A Board is captured as a series of tiles. The tiles slightly overlap with neighboring tiles, so that the entire image is scanned with no "missing" spaces. The location of each tile is known from the position and direction of the camera on the pan/tilt head when the tile is scanned. The tiles may be described as "raw image" or "camera image" tiles, in that no processing has been done on them to either interpret or precisely locate them in the digital image. In step 102 center-surround processing is performed on each camera image tile. Center-surround processing compensates for the lightness variations among and within tiles.

Step 104 finds corresponding "landmarks" in overlapping tiles. "Landmarks" are described as marks on the Board which may be used to provide the correct orientation and overlap position of neighboring tiles. Landmarks that appear in a region of overlap between two tiles will be used to "match up" those two tiles to reconstruct the image.

Step 106 solves for perspective distortion corrections that optimize global landmark mismatch functions. This step corrects for errors that occur in the dead reckoning of the tile location in the image. The transformation is weighted by a confidence in the location of each landmark, which is obtained in the previous step. Step 108 performs perspective corrections on all the tiles using the perspective transformation determined in step 106.

In step 110, the corrected data for all the tiles is written into a grey-level Board rendition image. In step 112, this grey-level image is thresholded, producing a binary, electronically manipulable rendition of the Board image.

In the discussion hereinafter, the actual steps of converting a Board image to a digital image will be assumed to be implemented as previously described.

C. General Features and Architectural Overview

FIGS. 3–6 illustrate general features of the present invention. Although the techniques of this invention support an open-ended class of design conventions for users to specify parameters and execute commands diagrammatically, for the purposes of illustration the techniques of the invention will be demonstrated with the particular command conventions shown in FIGS. 3–6.

Further, it will be clear to one of skill in the art that while the discussion below describes acting upon a selection in terms of transcribing portions of the image, the system may alternatively perform other types of actions upon receipt of a pressed button command, depending on the desires of the developer. Further, different shapes of buttons may conceivably be used for different command. This, however, would add to the complexity of the analysis and may adversely affect system performance.

Figure 3:
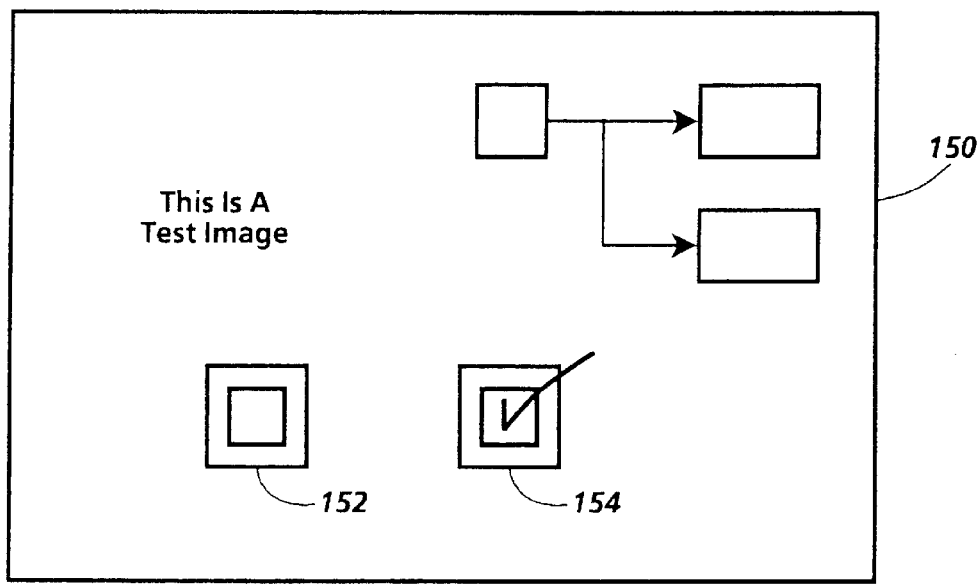
FIG. 3 shows a board image including a hand drawn button consisting of two nested squares.

FIG. 3 shows a board image 150. The heart of a user's command in the present embodiment is a command designator comprising a hand drawn button consisting of two "nested" squares-one square immediately inside the other. This is referred to as a NESTED-BOX-BUTTON, or NBB 152.

Drawing an "x" or a checkmark in the button, as shown by button 154, initiates image transcription.

Figure 35:
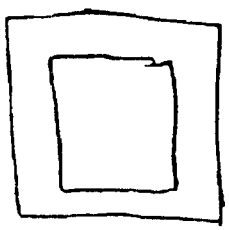
FIG. 35 shows examples of other possible command symbols
Figure 35:
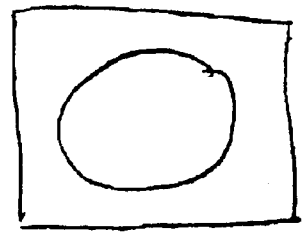
Figure 35:
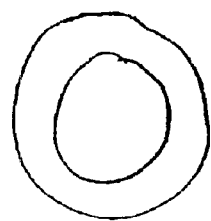
Figure 35:
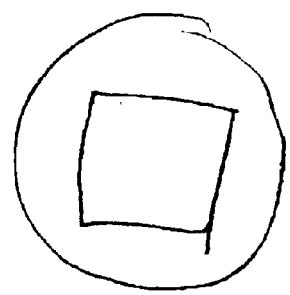
Figure 35:
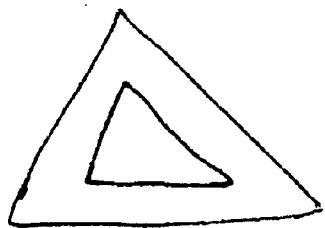

Clearly other geometric shapes may be used as command designators in addition to or replacing the boxes. For example, any of the geometric shapes shown in FIG. 35 provides a non-exhaustive set of examples of shapes that may form suitable buttons, depending upon the desires of the system designer. Some shapes, particularly nested similar shapes, are easier to reliably detect. Nested boxes, however, have an added advantage of being easy to construct reliably, and provide an easy to create interface for even an untrained user.

Figure 4:
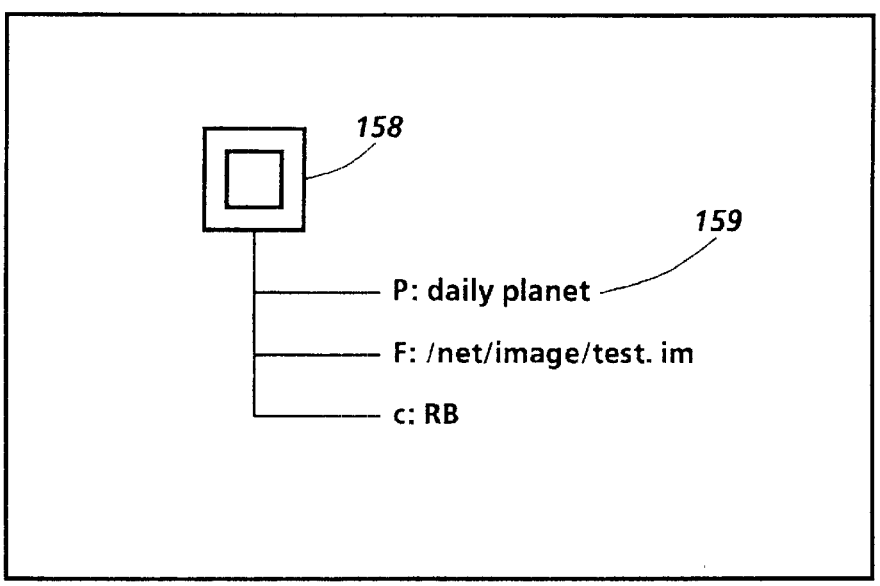
FIG. 4 shows a complex hand drawn command structure including lines leading to symbolic textual annotations.

Optionally, a number of auxiliary parameters or directives may be attached to the button via curvilinear lines. These may lead to image demarcation symbols, to directive alphanumeric characters, or to text. For example, FIG. 4 shows a complex NBB 158 including lines leading to symbolic textual annotations directing that hardcopy be sent to a printer "daily planet," that an image file be stored called "test.im," and that only red and blue colors be transcribed. Analysis of the region associated with these curvilinear lines may be performed through a variety of methods. For example, applicant's copending, coassigned U.S. Patent Application Serial No. (Attorney Docket No. D/94267Q), incorporated herein by reference, provides a method for determining the segmentation of text lines in the image. Such information may be used to extract text from the image for recognizing by a text recognition system.

Figure 5:
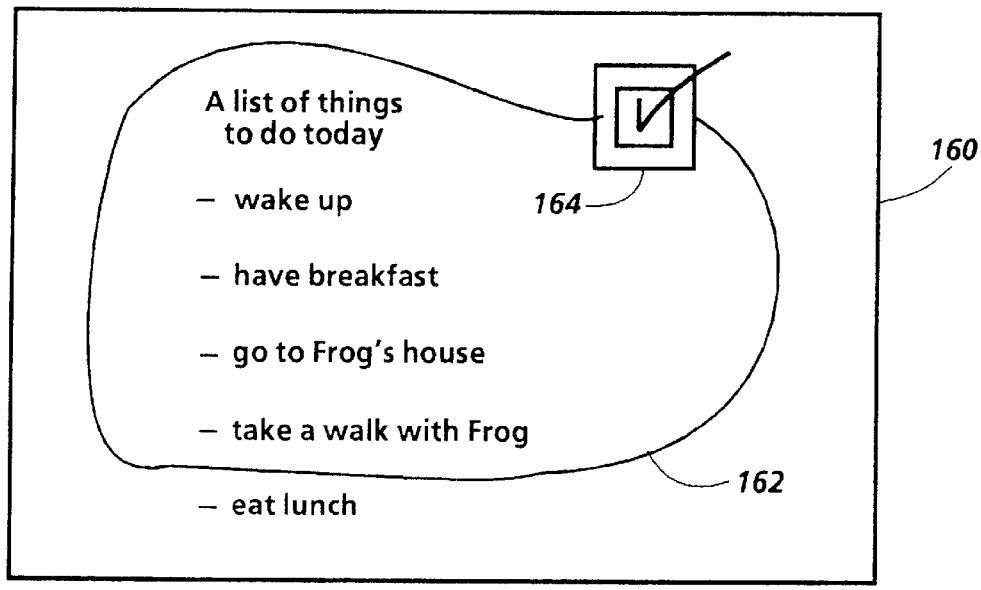
FIG. 5 shows an image with a selected region including hand written text lines.
Figure 6:
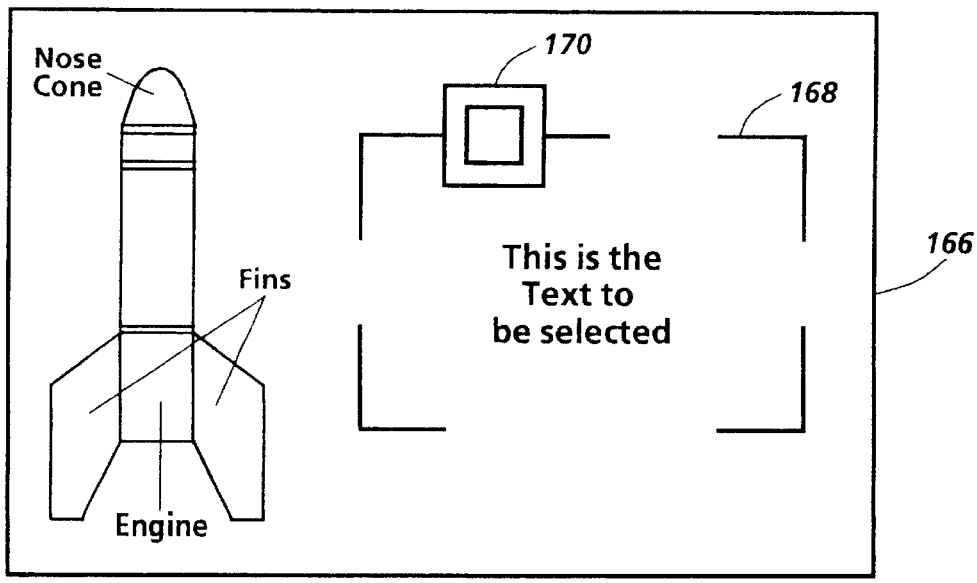
FIG. 6 shows an image with demarcation lines which may be used to designate a region of the image.

FIG. 5 shows an image 160, a portion of "A list" in "Frog and Toad Together," by Arnold Lobel, ©1972, HarperCollins Publishers. Image 160 has a region 162 encompassed by curvilinear lines, selected by NBB 164. In FIG. 6, a portion of image 166, shown by demarcation lines 168, is attached to NBB 170. In FIG. 6, for example, these demarcation lines may be used to designate that only the region encompassed by, or inside, demarcation lines 168 is to be transcribed.

Figure 7:
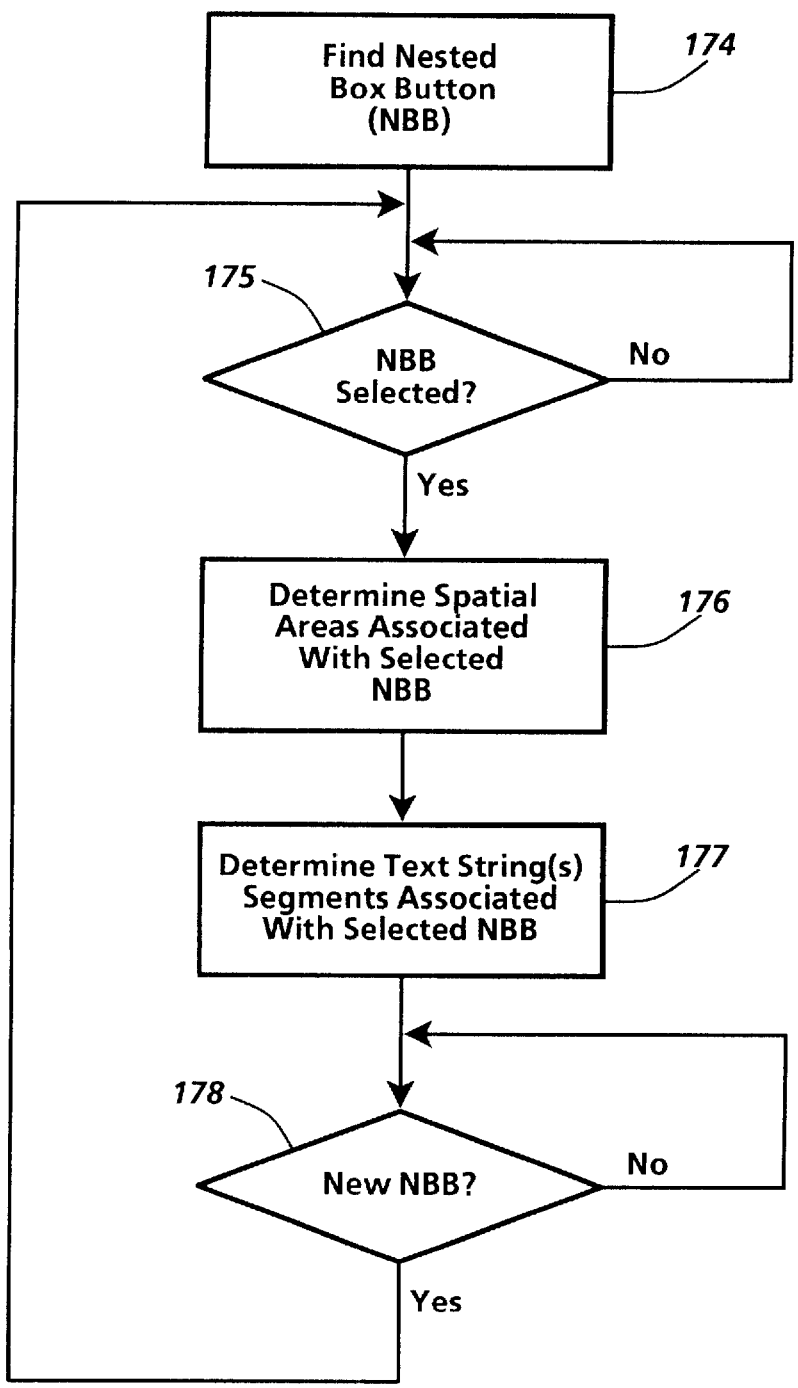
FIG. 7 describes the basic steps involved in using the features illustrated in FIGS. 3–6.

FIG. 7 describes the basic steps involved in using the features illustrated in FIGS. 3–6. Step 174 finds a NBB, such as NBB 152. Step 175 checks to see if the NBB is selected. If it is, step 176 determines spatial areas associated with the selected NBB, such as area 162 in FIG. 5. Step 177 determines text segments that are associated with the selected NBB, such as text string 159 in FIG. 4. Finally step 178 checks for other or new NBBs to perform the analysis for.

Figure 8:
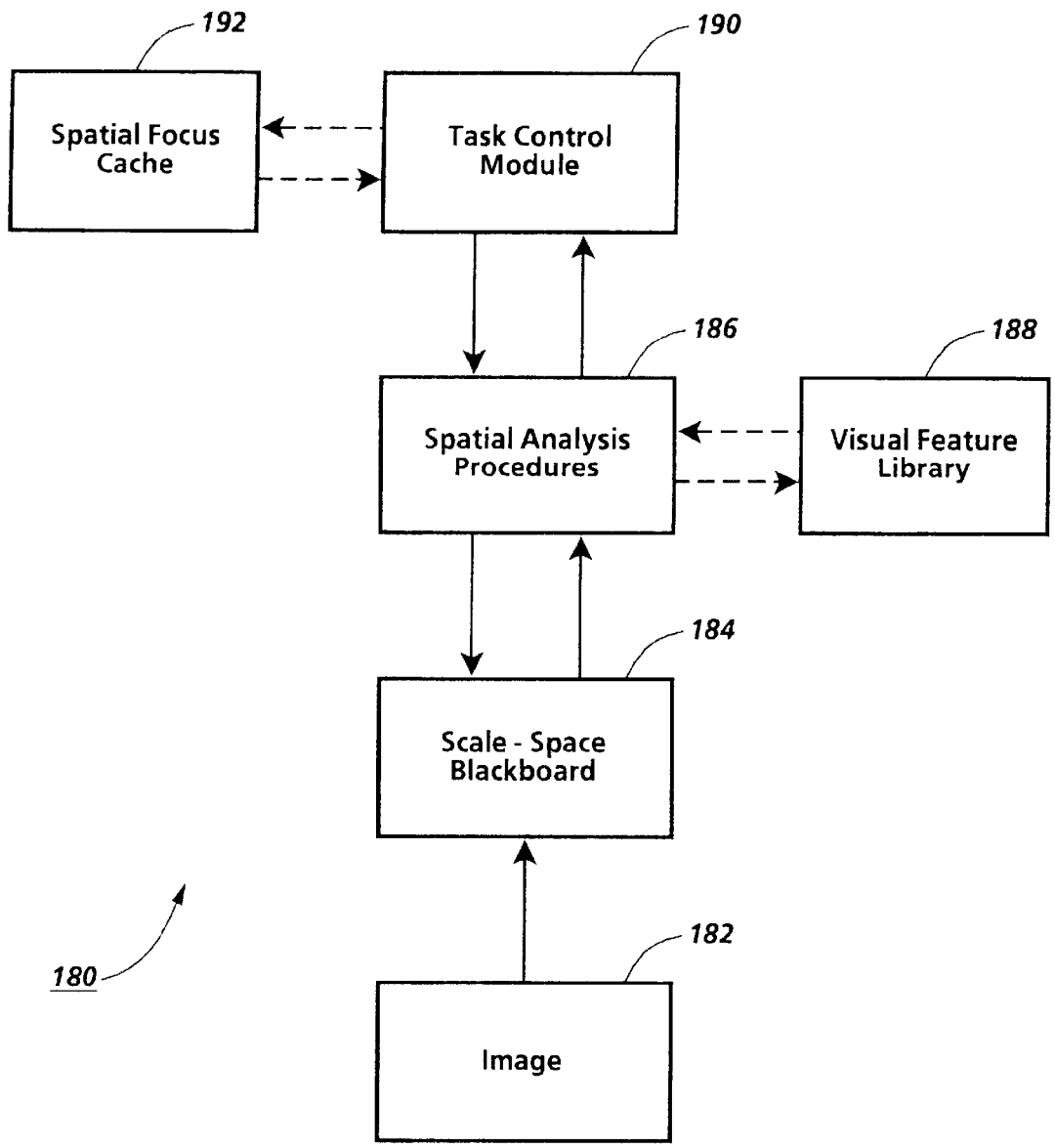
FIG. 8 presents the overall functional architecture 180 of the present invention.

FIG. 8 presents the overall functional architecture 180 of the present invention. The core image analysis technique for interpreting diagrammatic commands under the present invention is spatially focused manipulation of "symbolic tokens," compact symbolic descriptors of portions of the image, in this case marks and combinations of marks. Information about the content of image 182 is maintained as symbolic tokens residing in the Scale-Space blackboard (SSB) data structure 184. These symbolic tokens serve as a resource for spatial analysis procedures 186, which may at times contribute new tokens to the Board data structure. At the top level, task control module 190 directs spatial analysis procedures 186 to collect information about image 182 in order to build descriptions of the aspects of the image that are relevant to the immediate task.

The Scale-Space blackboard data structure 184 facilitates spatial and geometric computations by providing indexing of symbolic tokens on the basis of spatial location and scale. These tokens are compact symbolic descriptors of abstract image events such as the occurrence of curves, corners, nested boxes, characters, etc. The SSB data structure 184 is further described in Saund, E., "Symbolic Construction of a 2-D Scale Space Image," IEEE TPAMI, V. 12 No. 8, August 1990. For convenience, in practice several SSB data structures may be maintained, each holding different kinds of information reflecting different stages of processing.

A large and extensible visual feature library 188 is maintained in connection with spatial analysis procedures 186, with a knowledge base of prototypical spatial events which can be labeled explicitly by placing new tokens on the SSB. Table 1 lists types of major analysis procedures employed in the present invention. These spatial analysis procedures underlie the major image analysis tasks of recognizing command symbols, tracing curvilinear paths, and segmenting lines of handwritten text.

For example, a procedure for finding corners may identify curvilinear tokens in a specified region of the SSB, and label pairs of tokens that form a corner-shaped configuration. For each such pair, a new CORNER token may be created and placed in the appropriate location on the SSB in SSB data structure 184.

TABLE 1

Major Visual Analysis Procedures identify tokens near specified location
identify tokens in specified direction from given spatial location
identify tokens aligning with specified token
select tokens with specified orientation
select tokens with specified curvature
select tokens with specified scale
label pairs of line tokens forming a corner configuration
label pairs of line tokens forming a parallel configuration
label pairs of line tokens forming a T configuration
label pairs of line tokens forming an X configuration
label pairs of corner tokens forming a nested corner configuration
label chains of aligning tokens forming a curvilinear arc
label groups of tokens forming a denseley textured region
determine whether appropriate nested corner and parallel tokens are present to form two nested boxes
trace chains of tokens meeting end-to-end The top level task control module 190 directs the application of spatial analysis procedures 186 according to a task execution strategy defined for the specific diagrammatic user interface specification. Associated with task control module 190 is a temporary store, spatial focus cache 192, which maintains state as to what button boxes or other task level objects are believed to be in the image, as well as information about locations of the image requiring examination in detail as processing resources become available.

D. Task Control

The top level task control module shown in FIGS. 9–14 directs the application of spatial analysis procedures to implement the general operation described in flowchart of FIG. 7 according to a task execution strategy defined for the diagrammatic user interface specification shown in FIGS. 3–6. More detail for specific analysis procedures is described in the following sections.

Figure 9:
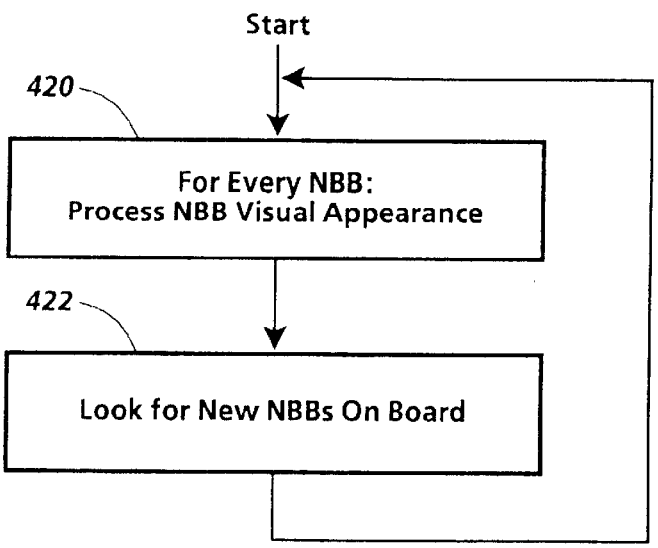
FIGS. 9–14 are flowcharts which show steps in the top level task control module for directing the general operation described in flowchart of FIG. 7.

In FIG. 9, step 420 processes the NBB visual appearance for every NBB on the Board, as will be described in relation to FIG. 10. Step 422 looks for new NBBs on the Board. This step may be performed periodically by checking through all tokens on the board, or may be performed for sections of the board where activity is known to have occurred.

Figure 11:
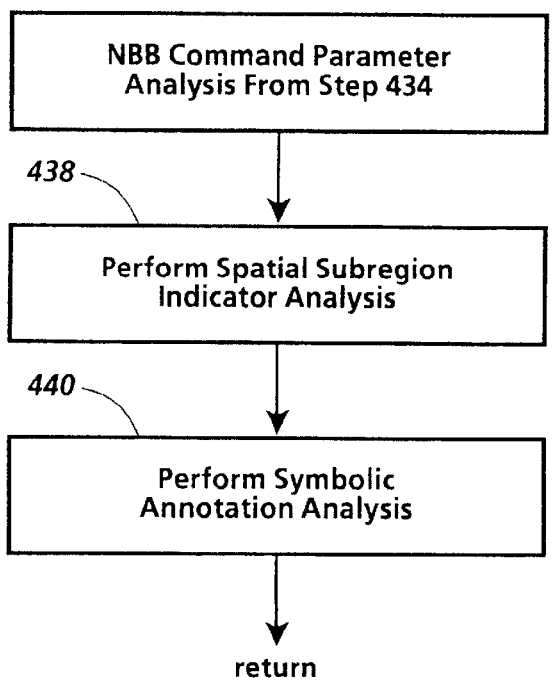
Figure 10:
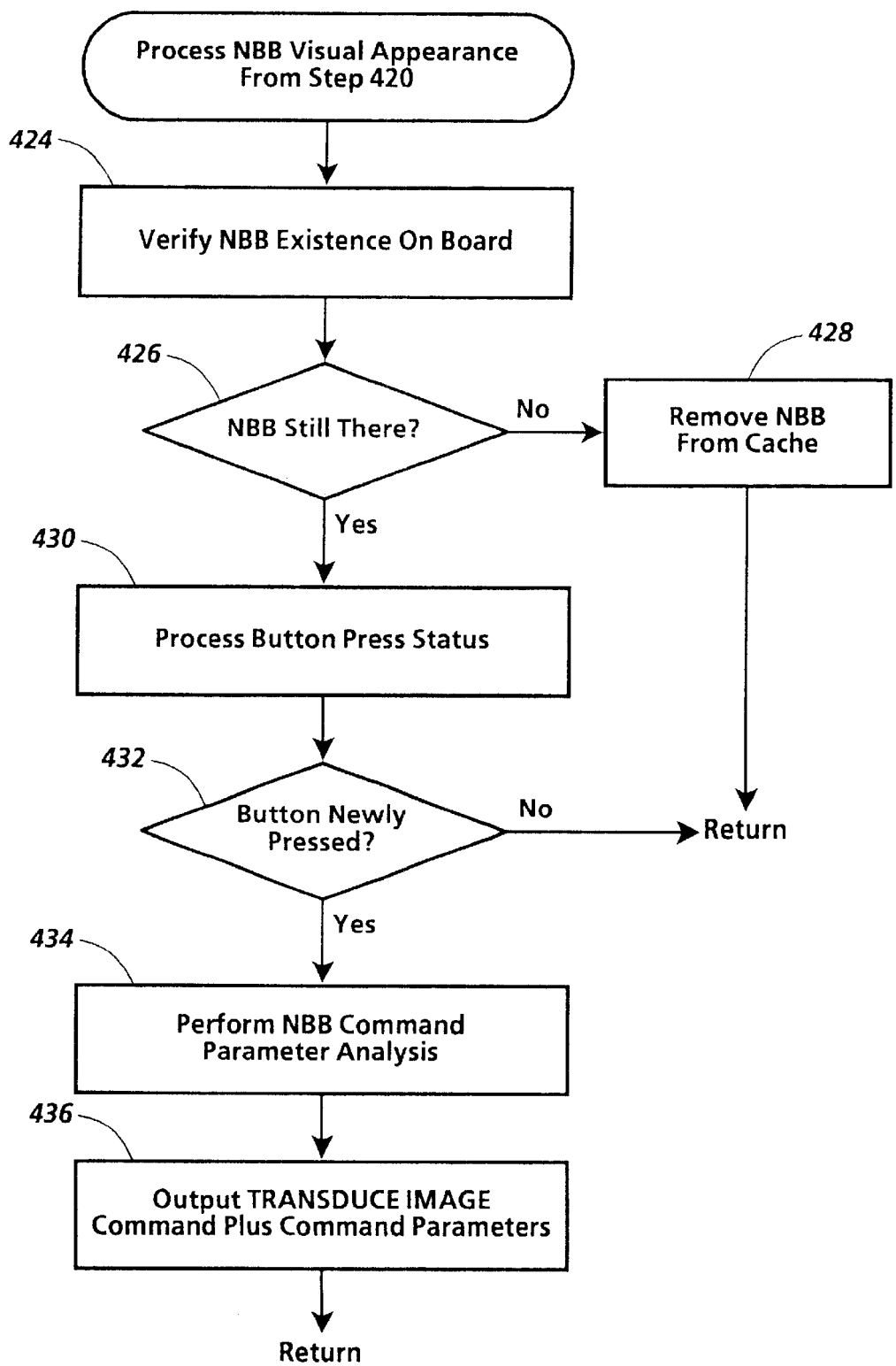

Step 424 of FIG. 10 verifies that the NBB exists on the Board, and if the NBB is no longer present at step 426, removes the NBB from the cache in step 428 and returns. If the NBB is still there, step 430 checks to see the button press status. If the button is newly pressed in step 432, then the command parameter analysis, as described in relation to FIG. 11, is performed. Step 436 outputs a transduce image command plus the command parameters before returning.

FIG. 11 analyzes command parameters associated with the NBB. Step 438 performs a spatial subregion indicator analysis, as will be described in relation to FIG. 12. Step 440 performs symbolic annotation analysis, as will be described in relation to FIG. 13.

Figure 12:
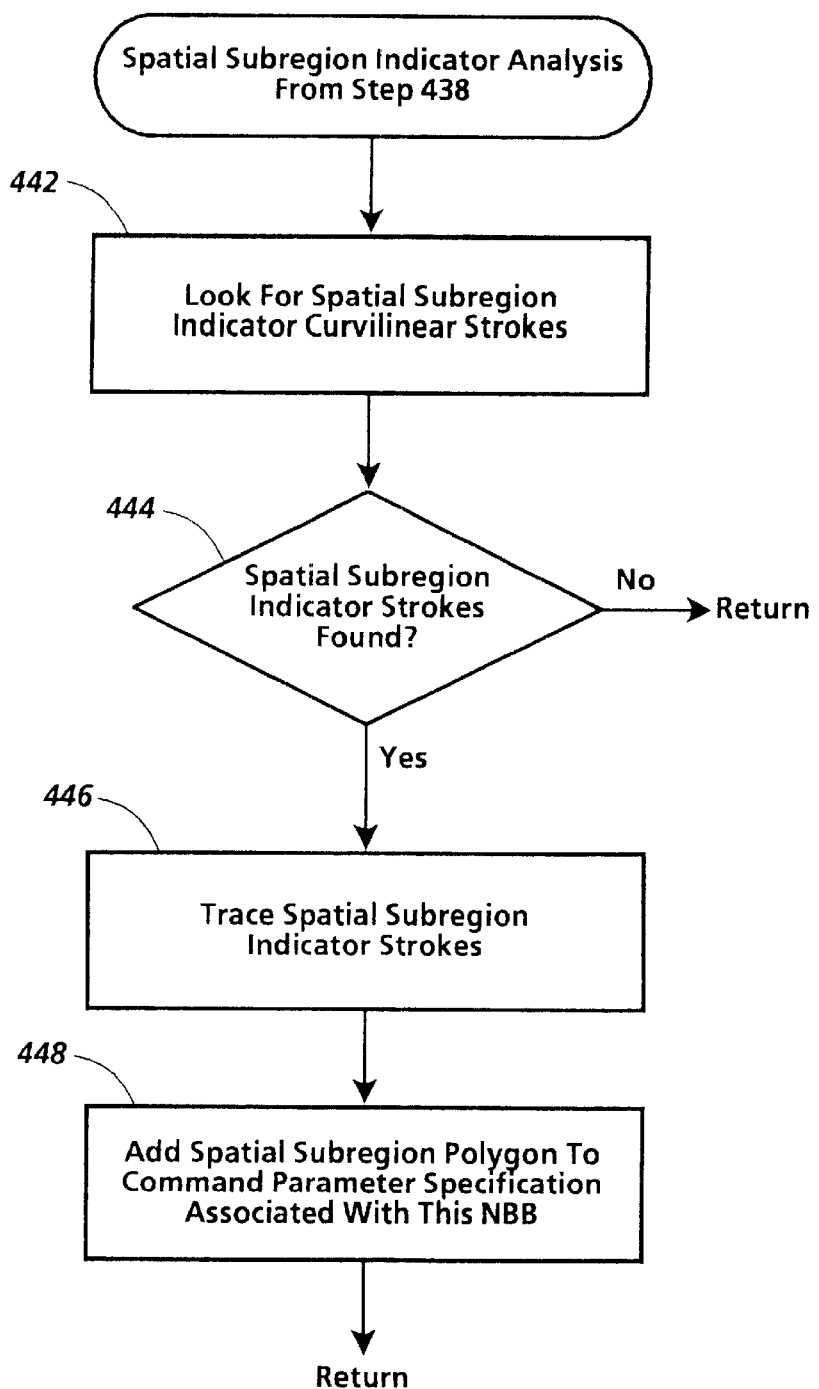

In FIG. 12 the spatial subregion indicators are analyzed to determine a spatial subregion associated with the NBB. Step 442 looks for spatial subregion indicator curvilinear strokes. If spatial subregion indicator strokes are found in step 444, then the strokes are traced in step 446. The spatial subregion polygon indicated by the tracing is added to the command parameter specification associated with that particular NBB in step 448.

Figure 13:
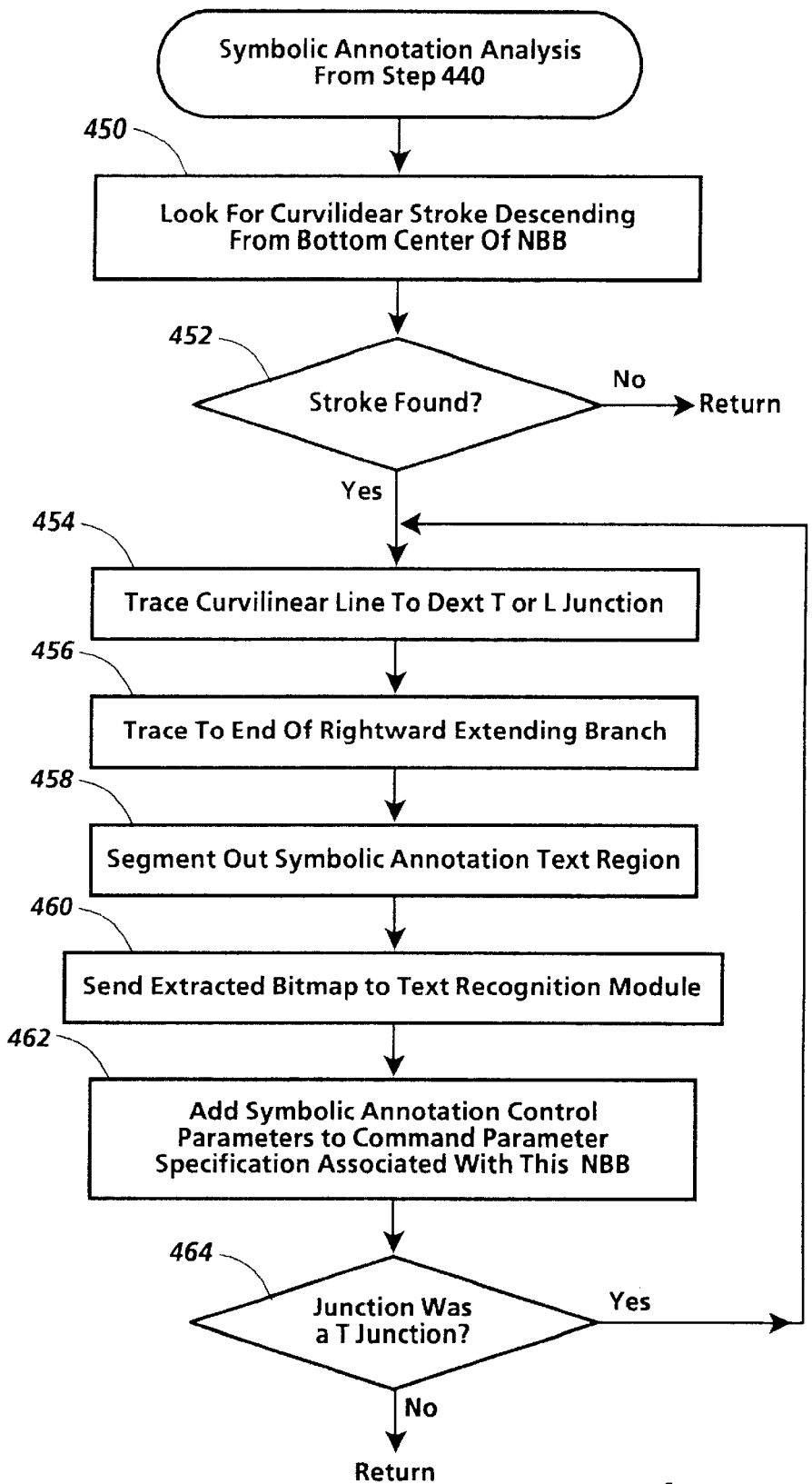

A determination and analysis of symbolic annotation regions associated with the NBB is performed by the steps of FIG. 13. Step 450 looks for curvilinear strokes descending from the bottom center of the NBB being analyzed. If a stroke is found in step 452, step 454 traces the curvilinear line to the next junction. Step 456 traces to the end of rightward extending branches, and step 458 segments out symbolic annotation text regions, for example using the method described in previously incorporated U.S. Pat. No. (Attorney Docket No. D/94267Q). Step 460 sends the extracted bitmap to a text recognition module, and step 456 adds symbolic annotation control parameters to the command parameter specification associated with this particular NBB.

If the junction was a "T" junction, at step 464 the system returns to trace the remaining leg of the curvilinear stroke.

Figure 14:
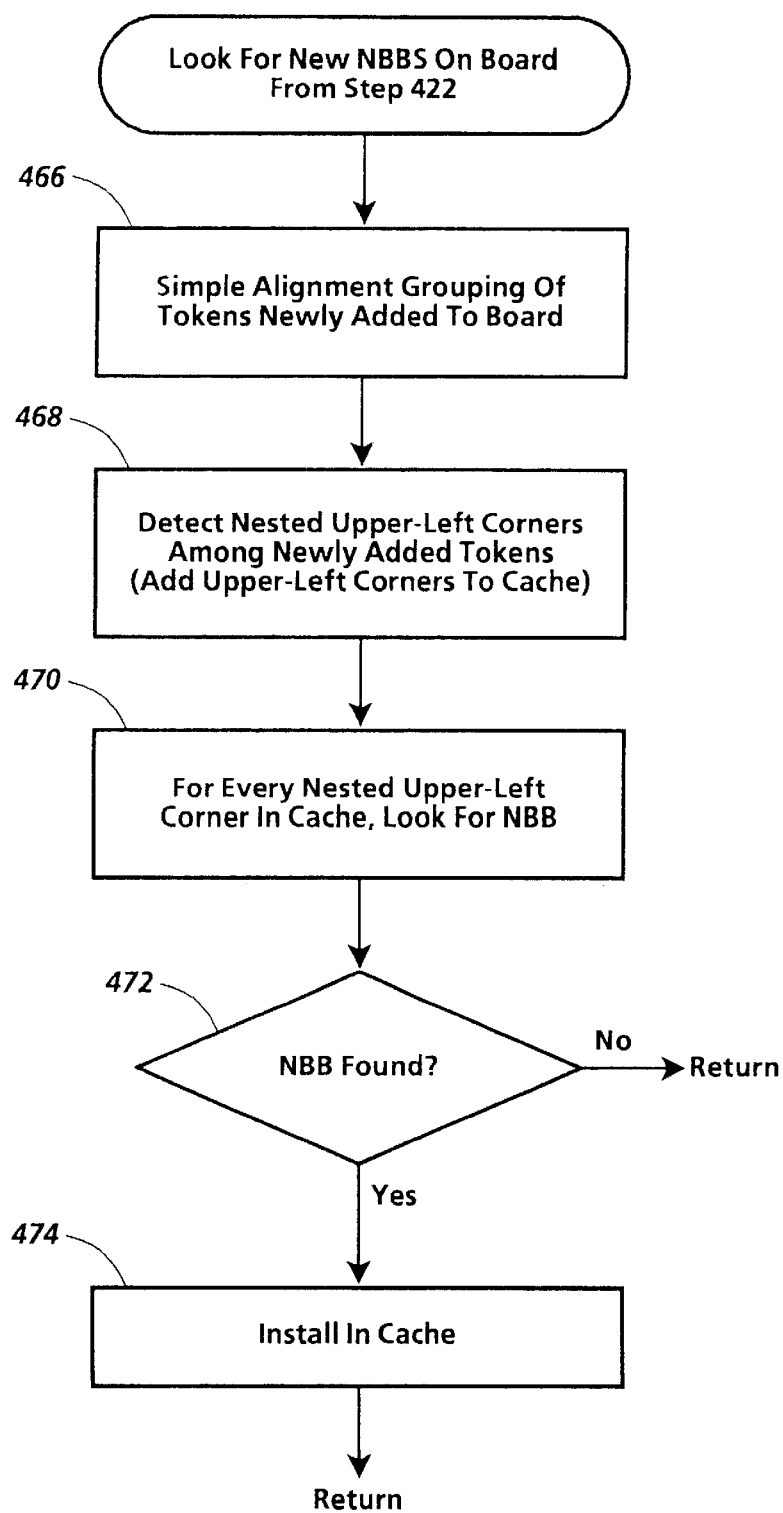

Finally, FIG. 14 looks for new NBBs on the Board. Step 466 groups aligning tokens that have been newly added to the Board. Step 468 detects nested upper-left corners among the newly added tokens. In step 470, every nested upper-left corner in the cache is checked for a NBB. If a NBB is found in step 472, it is installed in the cache in step 474, and its visual appearance will be analyzed in step 420.

E. Processing Techniques

The following description and figures describes image processing techniques that may be used to identify tokens, trace curves and corners, and segment handwritten text lines to implement the techniques of task control as described above.

i. Basic Curvilinear Processing

Figure 15:
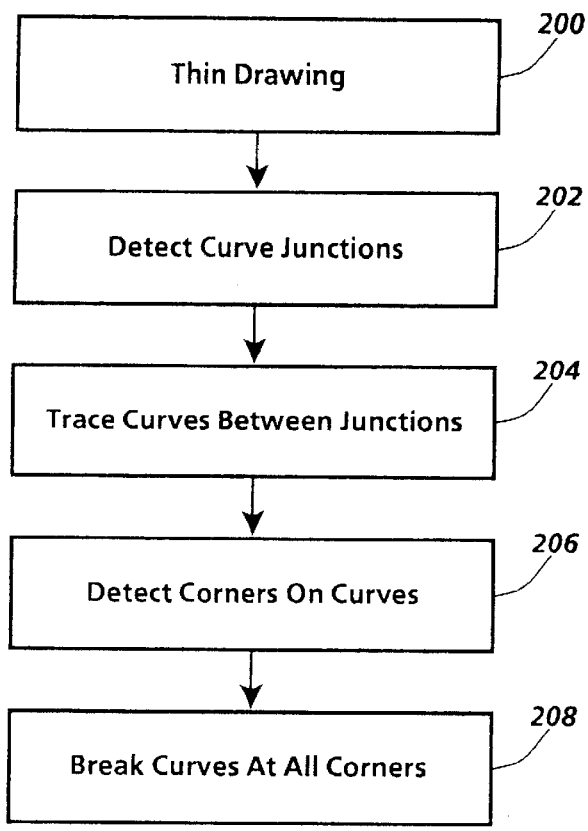
FIG. 15 is a flowchart which shows steps used to identify curve fragments.

The most primitive type of token is called a PRIMITIVE-CURVE-FRAGMENT, representing relatively straight sections of curves having no internal junctions or crossings with other curves. The steps shown in FIG. 15 are used to identify curve fragments.

Step 200 first thins the lines of the drawing using morphological erosion, a technique well-known to practitioners of computer vision. Step 202 detects curve junctions using a morphological hit-miss transform with masks that reflect junction configurations of 3×3 pixels.

Step 204 traces curves between junctions, using any one of many curve tracing methods well known in computer vision literature. Step 206 detects corners on curves. Techniques for doing this are also available in computer vision literature.

Step 208 breaks curves at corners, leaving elementary fragments to be labeled as PRIMITIVE-CURVE-FRAGMENT type tokens, which are written onto the SSB data structure.

These processing steps are further described in copending, coassigned patent application Ser. No. 101,646 "Method for Dynamically Maintaining Multiple Structural Interpretations in Graphics Systems," to Saund, et al. herein incorporated by reference.

ii. Command Symbols

In the present invention, command symbols take the form of nested boxes and associated curvilinear lines, as described in relation to FIGS. 3–6. Tokens are identified as previously described, each having a location, orientation, length, and curvature. In the space of all possible positions, each pair of tokens may be measured to evaluate how good a corner they form. (This evaluation of "how good a corner" may be based on threshold parameters set by the system designer.)

In the present embodiment, as explained above, nested boxes are used to denote command buttons. The techniques described below demonstrate only the detection of NBB command symbols, but the technique clearly extends readily to a broad class of possible command symbol shapes, such as those shown in FIG. 35.

Figure 16:
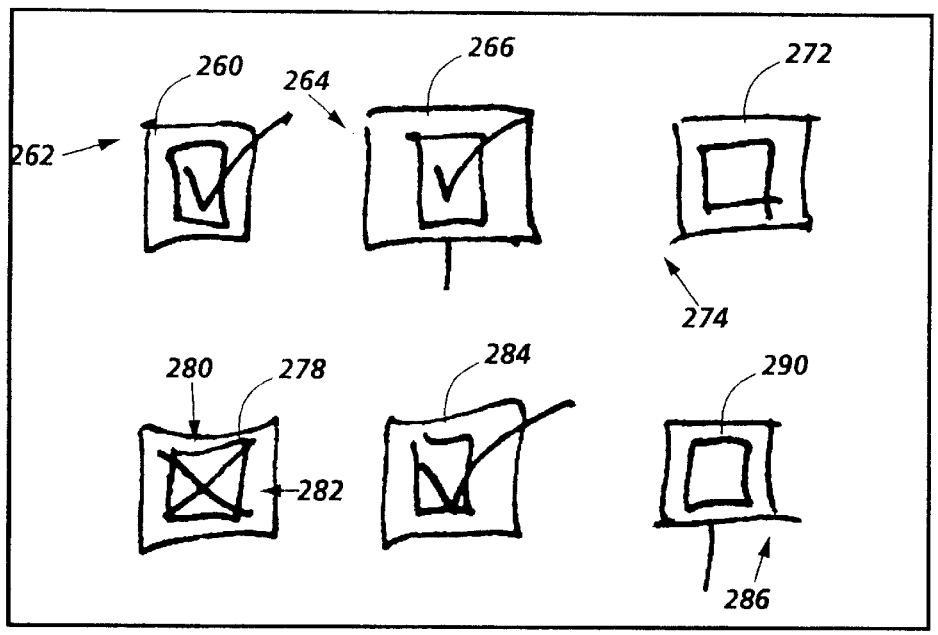
FIG. 16 shows some typical hand drawn nested box buttons (NBB).
Figure 17:
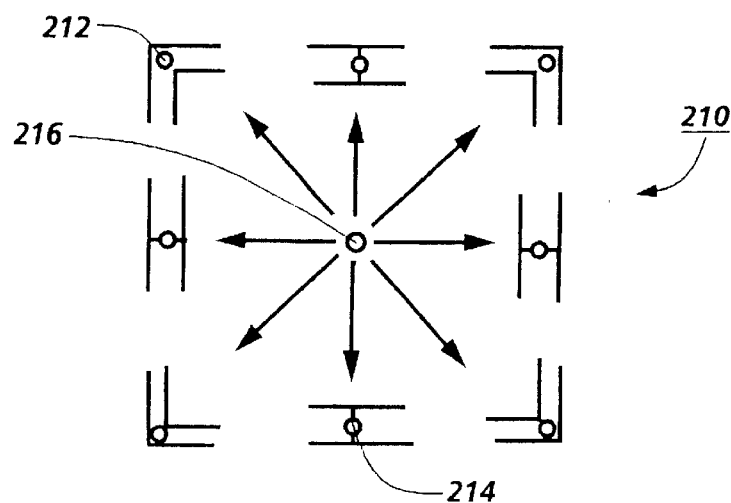
FIG. 17 illustrates general features required of a NBB.

A NBB may be described as two boxes which are nested within one another. Symbolic tokens are generally made up of other, smaller, subtokens. FIG. 17 shows an example of subtokens which make up a nested box button symbolic token. A NBB 210 is established if NESTED-CORNER subtokens, such as 212, and PARALLEL-LINE subtokens, such as 214, are found in appropriate proximity and orientation with respect to a hypothesized button center 216. Users, however, are typically not especially careful about the precision and accuracy of the diagrammatic command drawings. FIG. 16 shows some typical hand drawn nested box buttons that may be input by a user, illustrating some of the difficulty in interpreting a diagrammatic user interface in typical computer vision systems. For example, some corners such as 262 and 264 may not completely meet, just as corners 274 and 286 have some lines that extend beyond the corner. Some lines, such as 280, may be more curved than straight, or may, like 282, contain breaks. The techniques of the present invention allow any of the NBBs shown in FIG. 16 to be correctly interpreted.

Figure 19:
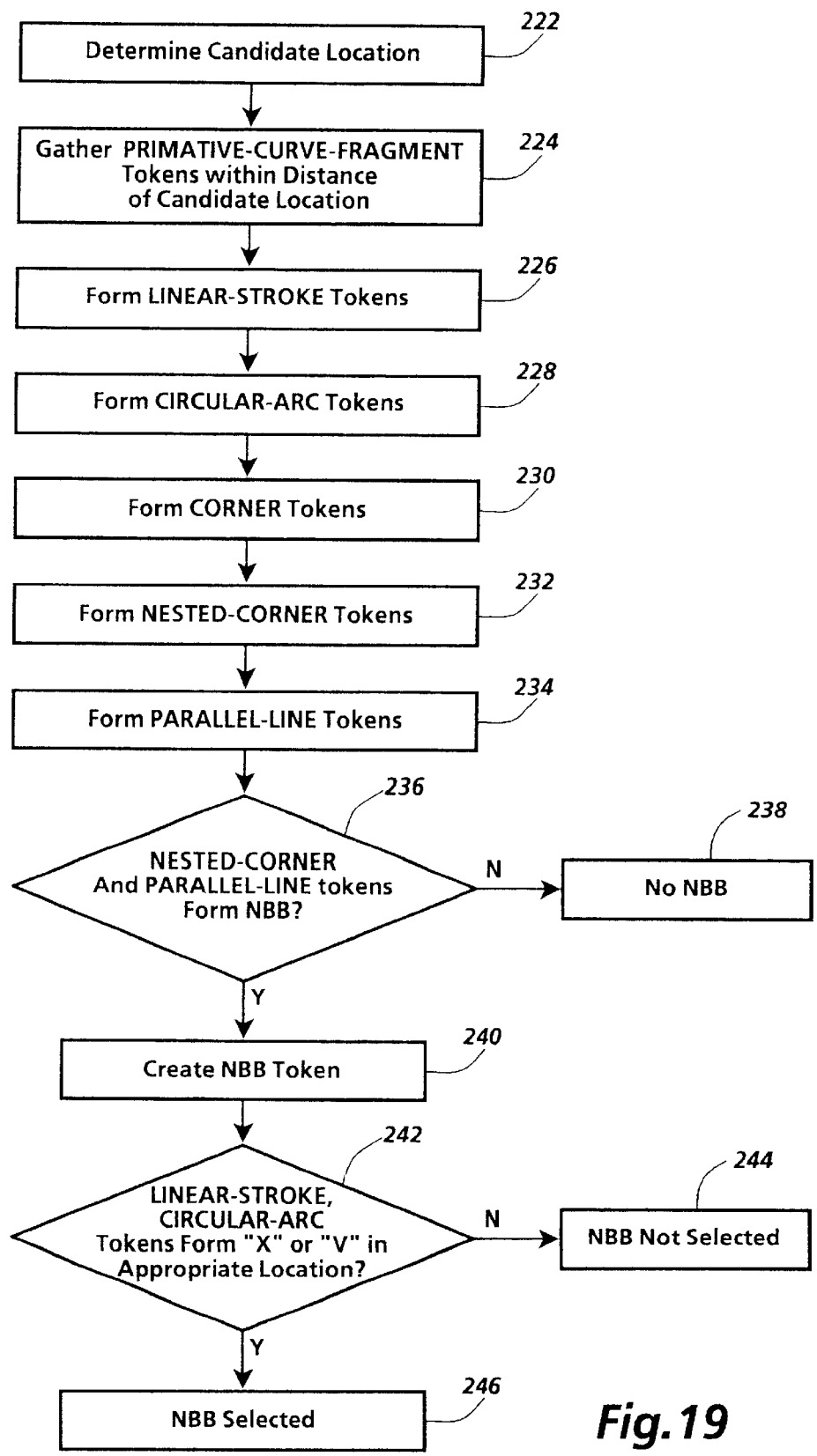
FIG. 19 is a flowchart which shows steps in determining a NBB, and whether or not it is selected, with the steps illustrated by FIGS. 20–27.
Figure 20:
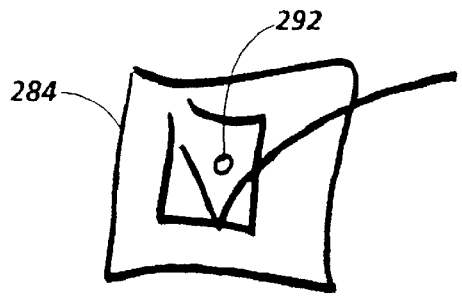

FIG. 19 describes the steps in determining a NBB, and whether or not it is selected, with the steps illustrated by FIGS. 20–27. Step 222 begins by finding a candidate location. In the present embodiment, an "upper left" nested corner 212 is searched for. Filters may be used on the various corners pairs to remove all tokens that can't be part of an upper left corner of an NBB. Upper left corners which are nested—one nearly inside the other—are selected. The center of a possible NESTED-BOX-BUTTON hypothesized by the location and size of the nested upper left corner is chosen as a candidate location. In FIG. 20, location 292 is the hypothesized button location for presumed NBB 284, and selected as a candidate location.

Figure 21:
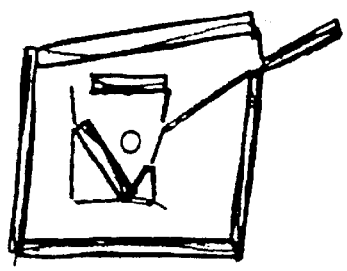

Step 224 gathers all PRIMITIVE-CURVE-FRAGMENT tokens lying within a prespecified scale-normalized distance from the candidate location, as shown in FIG. 21.

Figure 18:
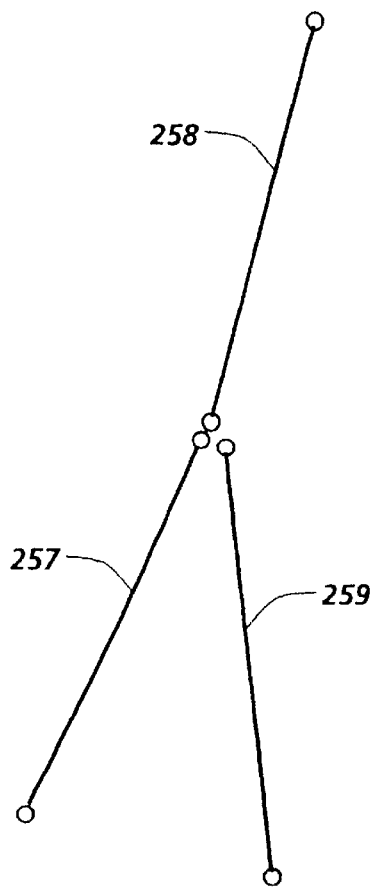
FIG. 18 illustrates alignment of curvilinear tokens.
Figure 22:
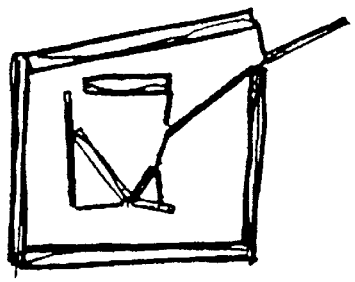

Step 226 forms LINEAR-STROKE type tokens by grouping PRIMITIVE-CURVE-FRAGMENT tokens that clearly align with one another, shown in FIG. 22. To determine "clearly aligned" tokens, tokens are examined pairwise. As shown in FIG. 18, for some pairs of tokens taken alone, such as tokens 257 and 258, which meet end to end with the same orientation, there is little question over their alignment. If one token approaches another at a slight angle, however, such as token 259 and token 258, it introduces some ambiguity, because token 258 could be aligned with either token 257 or 259. The system must therefore look at pairs of tokens, and then look in the vicinity of aligned pairs to find any other candidates for alignment. If the "second best" token is much less aligned than the first, and if the first two tokens are mutually the "best" alignment, then the first two are clearly aligned. If the second best is only slightly less well aligned, however, then all three tokens may be determined to not be "clearly aligned."

Figure 23:
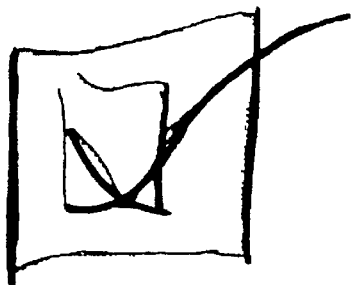

Returning to FIG. 19, step 228 forms CIRCULAR-ARC type tokens by grouping PRIMITIVE-CURVE-FRAGMENT tokens that align with one another along a circular arc, as shown in FIG. 23. Unlike LINEAR-STROKE tokens, CIRCULAR-ARC tokens may overlap and share support at the level of PRIMITIVE-CURVE-FRAGMENT tokens.

Figure 24:
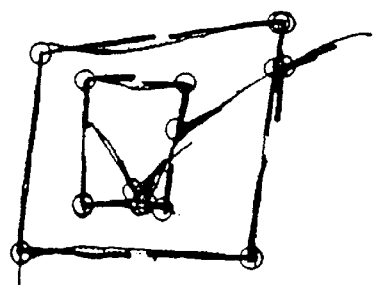
Figure 25:
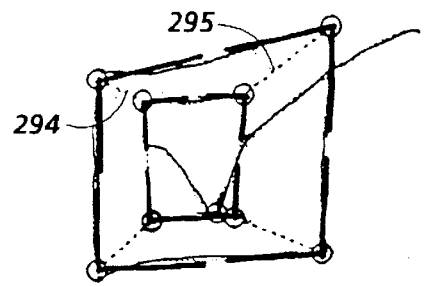

Step 230 forms CORNER type tokens, shown in FIG. 24, by finding pairs of LINEAR-STROKE and/or CIRCULAR-ARC tokens that form a corner configuration. In order to support a CORNER, a CIRCULAR-ARC token has to form only a shallow arc. In step 232, NESTED-CORNER type tokens are formed by finding nested pairs of CORNER tokens. In FIG. 25, dotted lines 294 and 295 show tokens grouped into NESTED-CORNERs.

Figure 26:
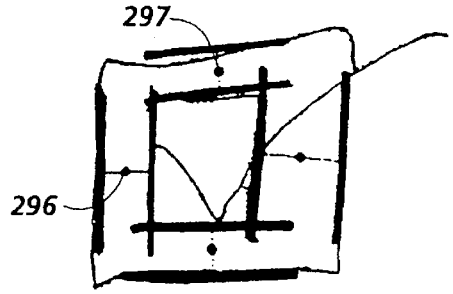

Step 234 forms PARALLEL-LINE type tokens by finding pairs of LINEAR-STROKE and/or CIRCULAR-ARC tokens lying parallel. Dotted lines 296 and 297 in FIG. 26 show PARALLEL-LINE type tokens.

In step 236, the system checks whether NESTED-CORNER and PARALLEL-LINE tokens are found in approximate locations and orientations consistent with the presence of two nested squares. If so, a new nested-box-button, or NBB token, is formed in step 240.

Figure 27:
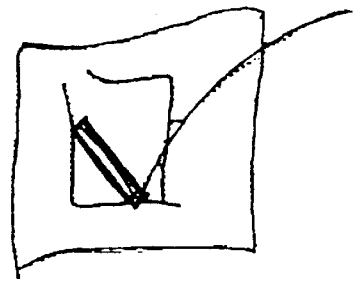

If a NBB has been found, step 242 checks for the presence of LINEAR-STROKE and/or CIRCULAR-ARC tokens forming an "X" or checkmark configuration, in the approximate appropriate location with respect to the location and size of the NBB, as shown in FIG. 27.

Alternatively, other symbols, such as simple slash marks, could also be used to select buttons. The flexibility of the parameters allows the system designer discretion in choosing specialized diagrams for what ever system the user interface is to be used on.

This token grouping approach differs from model-based matching approaches conventionally employed in the computer vision community, and succeeds in recognizing imprecisely drawn command symbols in the presence of confounding data such as check marks and the curvilinear lines connecting to the nested box button shapes.

iii. Tracing Curvilinear Paths for Spatial Subregion analysis

Curvilinear paths are useful in diagrammatic user interfaces for encircling regions and for forming links among command symbols and other directives such as text annotations. The basic token grouping approach underlying this invention, described previously, supports tracing of simple curvilinear paths, curvilinear paths crossed by other lines, branching curvilinear paths, and broken curvilinear paths.

Curve tracing makes use of PRIMITIVE-CURVE-FRAGMENT tokens and CURVE-END tokens associated with each end of each PRIMITIVE-CURVE-FRAGMENT.

Figure 28:
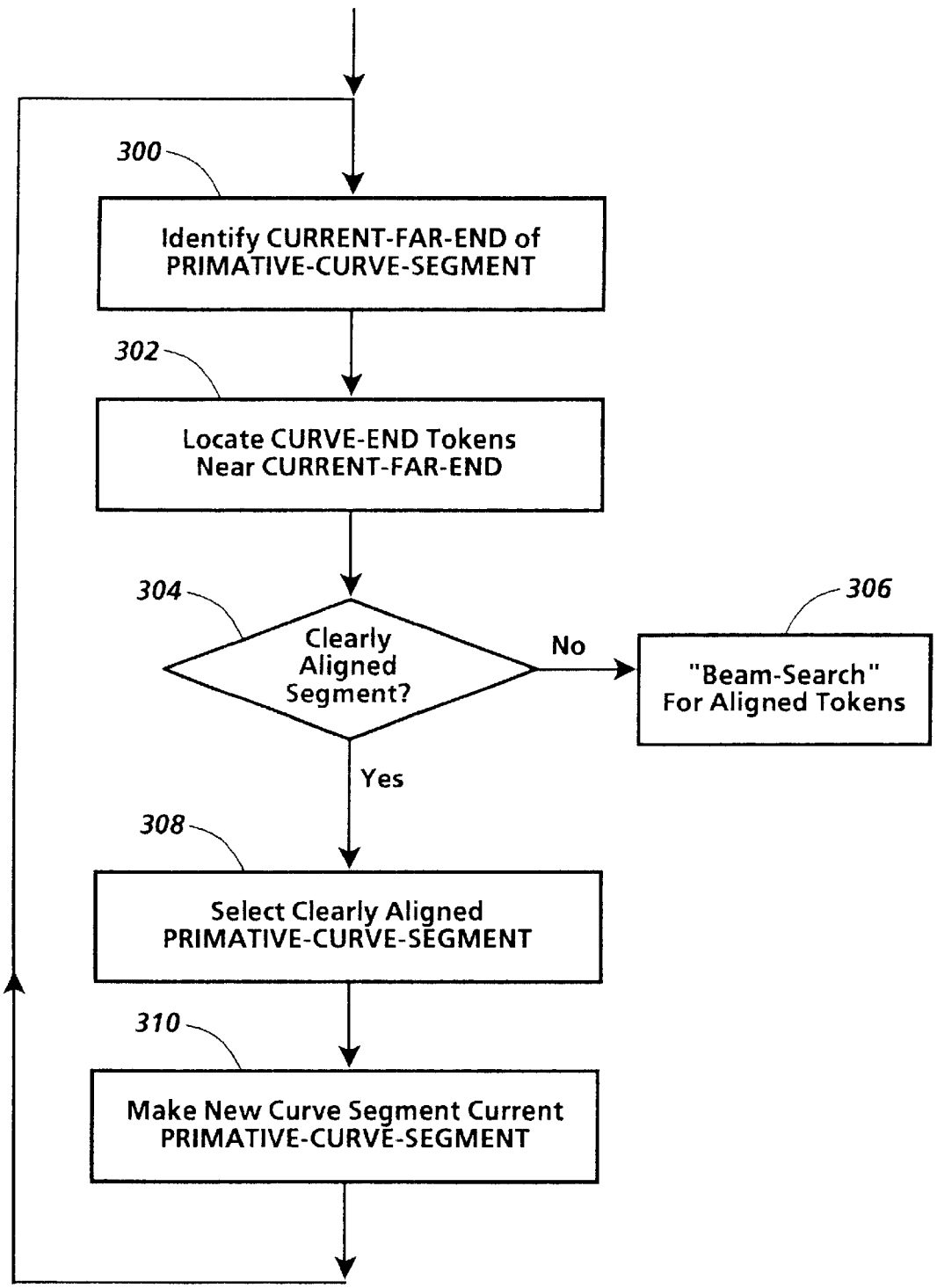
FIG. 28 is a flowchart which shows steps for simple curve tracing. Simple curve tracing is illustrated by FIG. 29.
Figure 29:
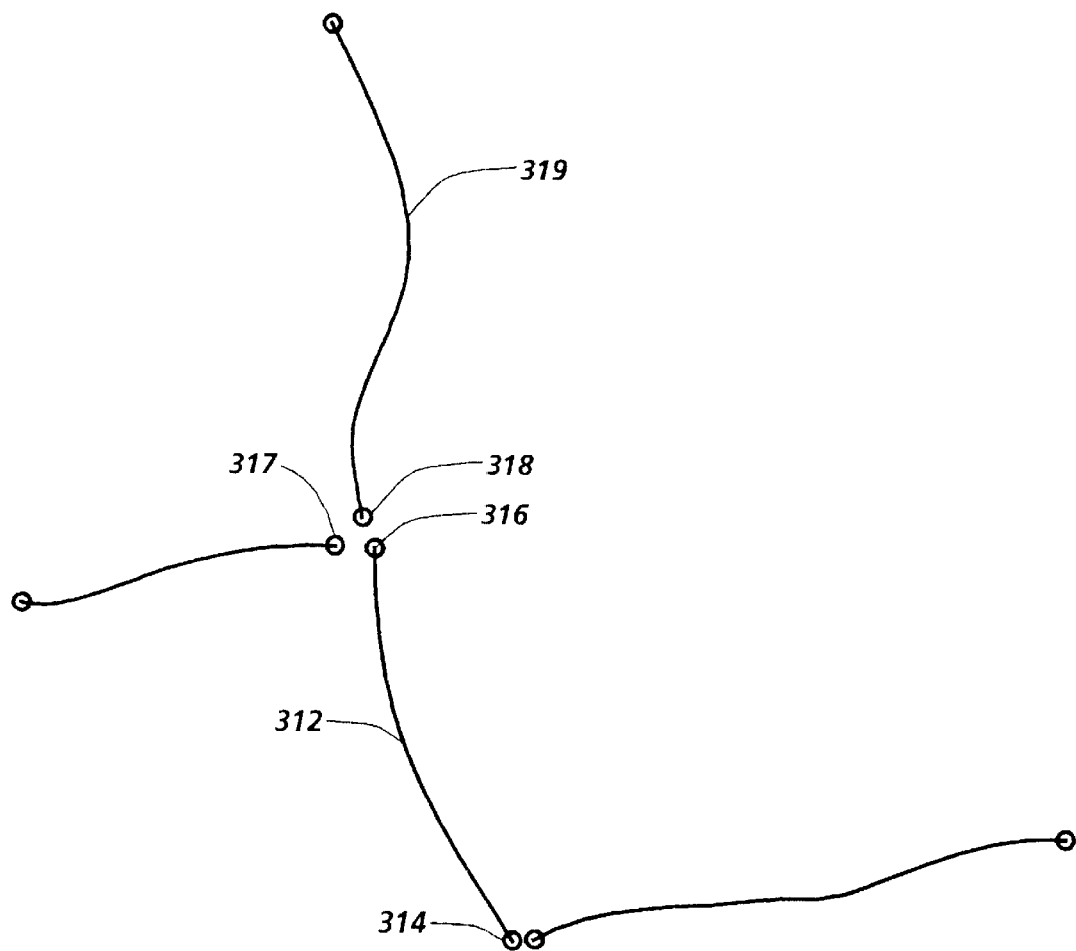

Input to a curve tracing routine consists of a PRIMITIVE-CURVE-FRAGMENT 312 in FIG. 29, and one of its associated CURVE-ENDs 314, which is called the "CURRENT-STARTING-END." Simple curve tracing operates as shown by the flowchart in FIG. 28, and illustrated by FIG. 29.

In step 300 the other end 316 from the starting end 314 of the PRIMITIVE-CURVE-FRAGMENT 312 is identified. This is called the CURRENT-FAR-END.

Step 302 locates CURVE-ENDs belonging to other PRIMITIVE-CURVE-FRAGMENTs near the CURRENT-FAR-END. In FIG. 29, CURVE-ENDs 317 and 318 are detected.

Step 304 checks the alignment of the other PRIMITIVE-CURVE-FRAGMENTs with the current PRIMITIVE-CURVE-FRAGMENT token, based on the CURVE-ENDs'relative location and orientation. If no segments are clearly aligned, a "beam-search," as will be described in FIG. 30, may be performed.

Step 308 selects which among the PRIMITIVE-CURVE-FRAGMENTs, if any, is clearly aligned with the current PRIMITIVE-CURVE-FRAGMENT token, and step 310 makes the aligning PRIMITIVE-CURVE-FRAGMENT the current curve segment, and the aligning CURVE-END the new current starting end, and returns to step 300 to continue tracing. In FIG. 29, PRIMITIVE-CURVE-FRAGMENT 319 aligns with PRIMITIVE-CURVE-FRAGMENT 312, PRIMITIVE-CURVE-FRAGMENT 319 becomes the current curve segment, and CURVE-END 318 the new current starting end.

Figure 30:
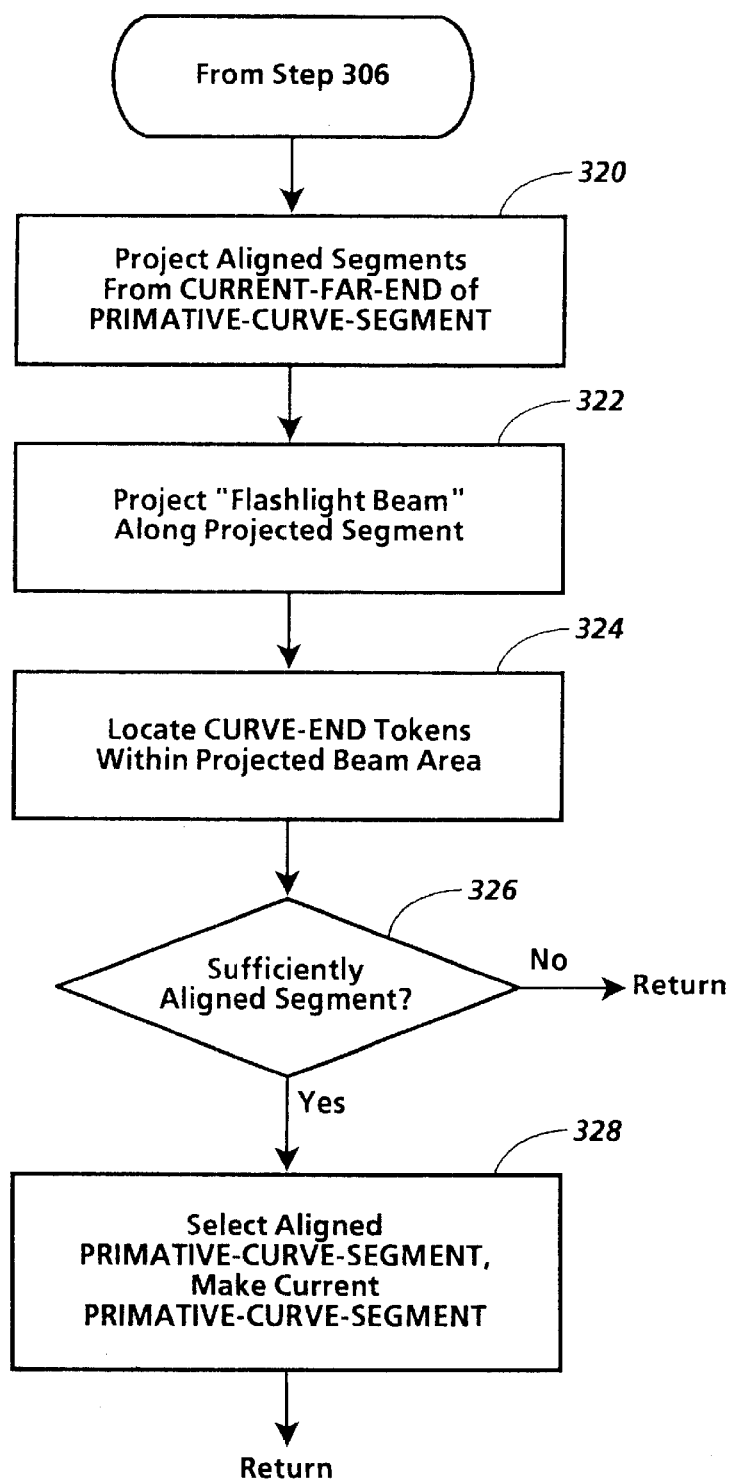
FIG. 30 is a flowchart which shows steps for beam search contour tracing.
Figure 31:
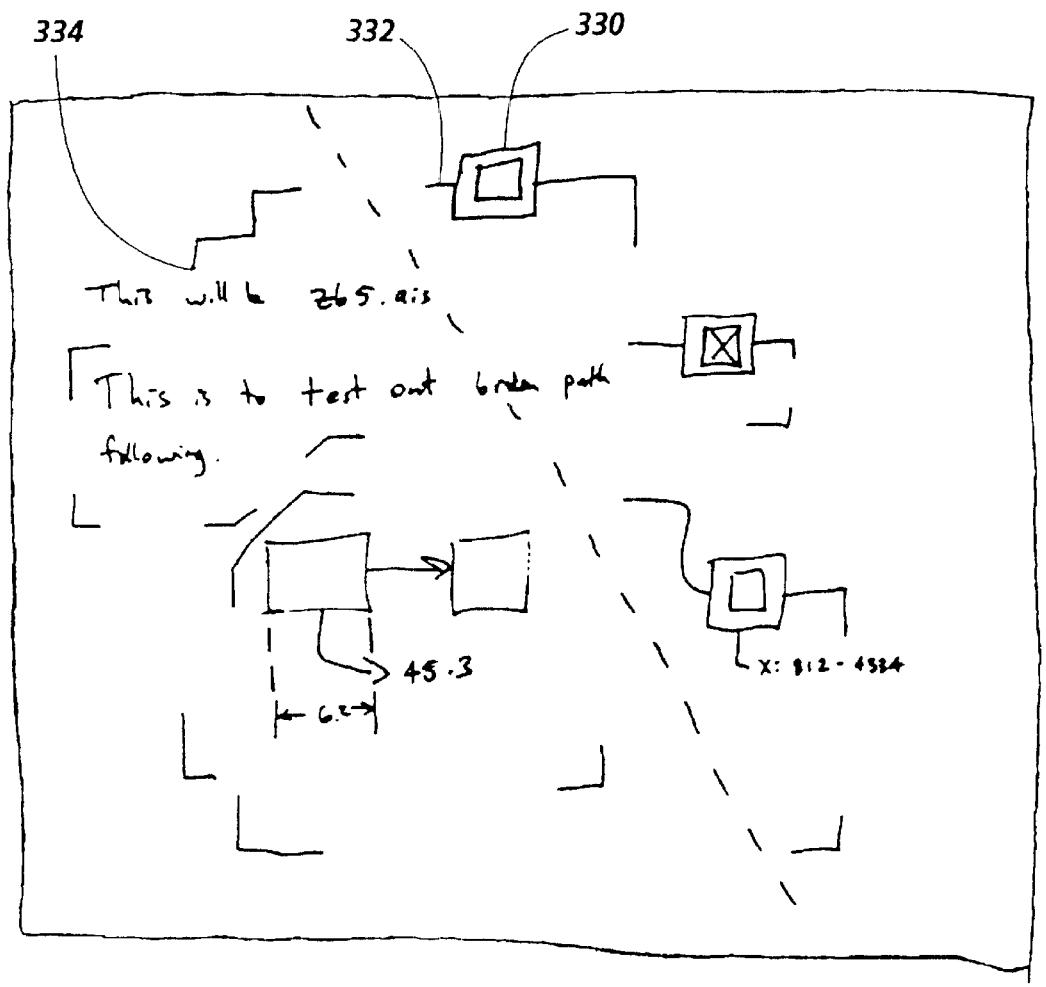
FIGS. 31–33 illustrate beam search contour tracing.

Tracing of broken curvilinear contours, such as tracing the corners of a polygon, makes use of the simple curve tracing algorithm above. However, when a contour segment has no clear continuation beyond its far end as determined in step 304, then a beam-search is used to search the SSB for tokens sufficiently aligned with the current token for the path to make a jump. The flowchart of FIG. 30 shows this contour tracing in relation to FIGS. 31–33.

In step 304 of FIG. 28, its was determined that there were no segments clearly aligned with the current PRIMITIVE-CURVE-FRAGMENT. For example, at segment 332 of FIG. 31, the far end from NBB 330 has no clearly aligned segment in its immediate vicinity. Likewise, segment 334 has no other clearly aligned segment in the vicinity of its lower end.

Figure 32:
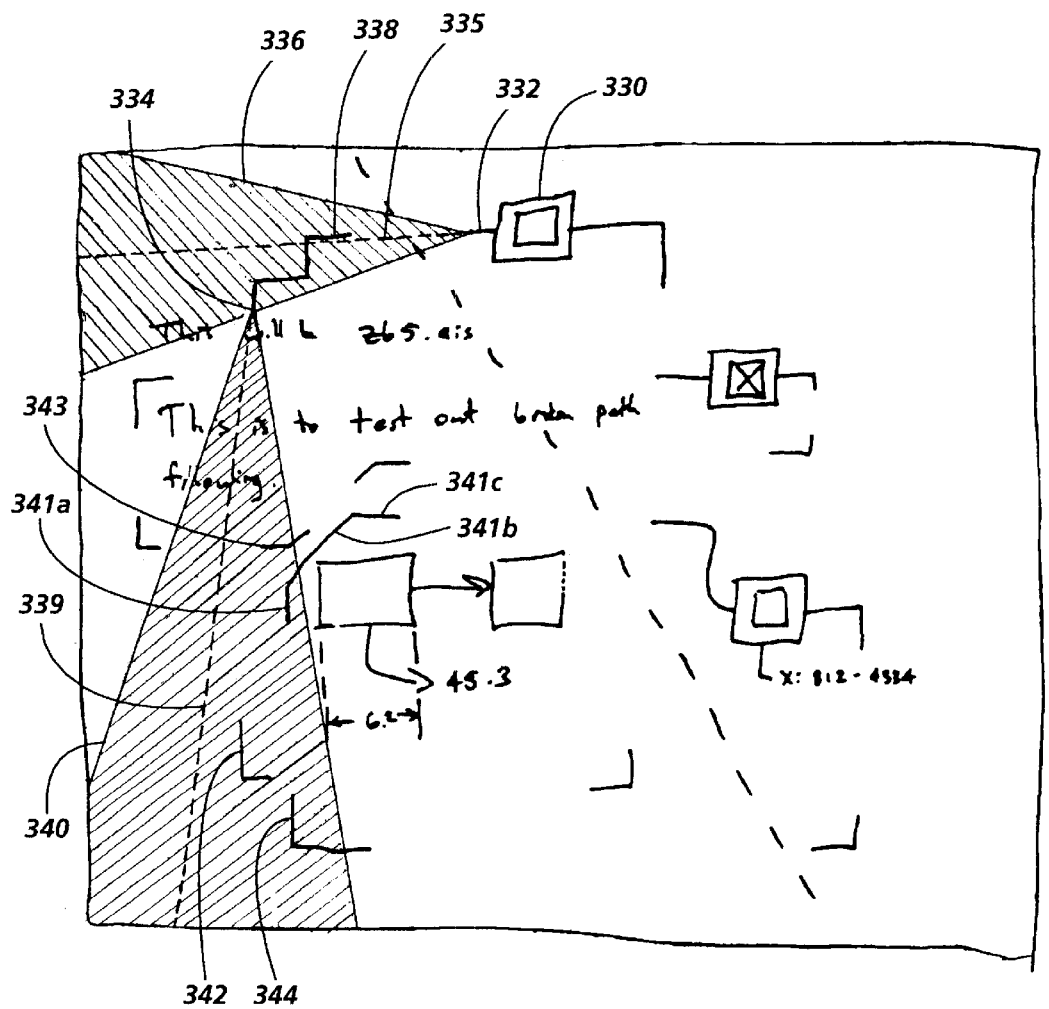

Step 320 then projects a segment from the CURRENT-FAR-END in the alignment of the current PRIMITIVE-CURVE-FRAGMENT, and then, in step 322, projects a "flashlight beam" pattern from the CURRENT-FAR-END and encompassing the projected segment. In FIG. 32, beam projection 336 is projected around projected segment 335, from the CURRENT-FAR-END of segment 332. Similarly beam projection 340 is projected around projected segment 339 aligned with the CURRENT-FAR-END of segment 334.

In step 324, CURVE-END tokens within the projected area are located. As shown in FIG. 32, the CURVE-END of segment 338 will be encountered by beam projection 336. Beam projection 340 will encounter several CURVE-END segments in its path—segments 341-344 all fall within the beam projection.

Step 326 checks the located tokens for sufficient alignment. In the case of beam projection 340, segment 341 is clearly not in the proper orientation to align with segment 334. Similarly, segment 343 would not be a candidate for since the end 343a of the segment 343 closed to segment 334 is already attached to another segment 337. Both segments 342 and 344 are properly oriented, however, segment 342 provides a better alignment with segment 334 than does segment 344. Step 338 selects the best aligned PRIMITIVE-CURVE-FRAGMENT, and makes the new segment the current PRIMITIVE-CURVE-FRAGMENT for continued tracing.

Figure 33:
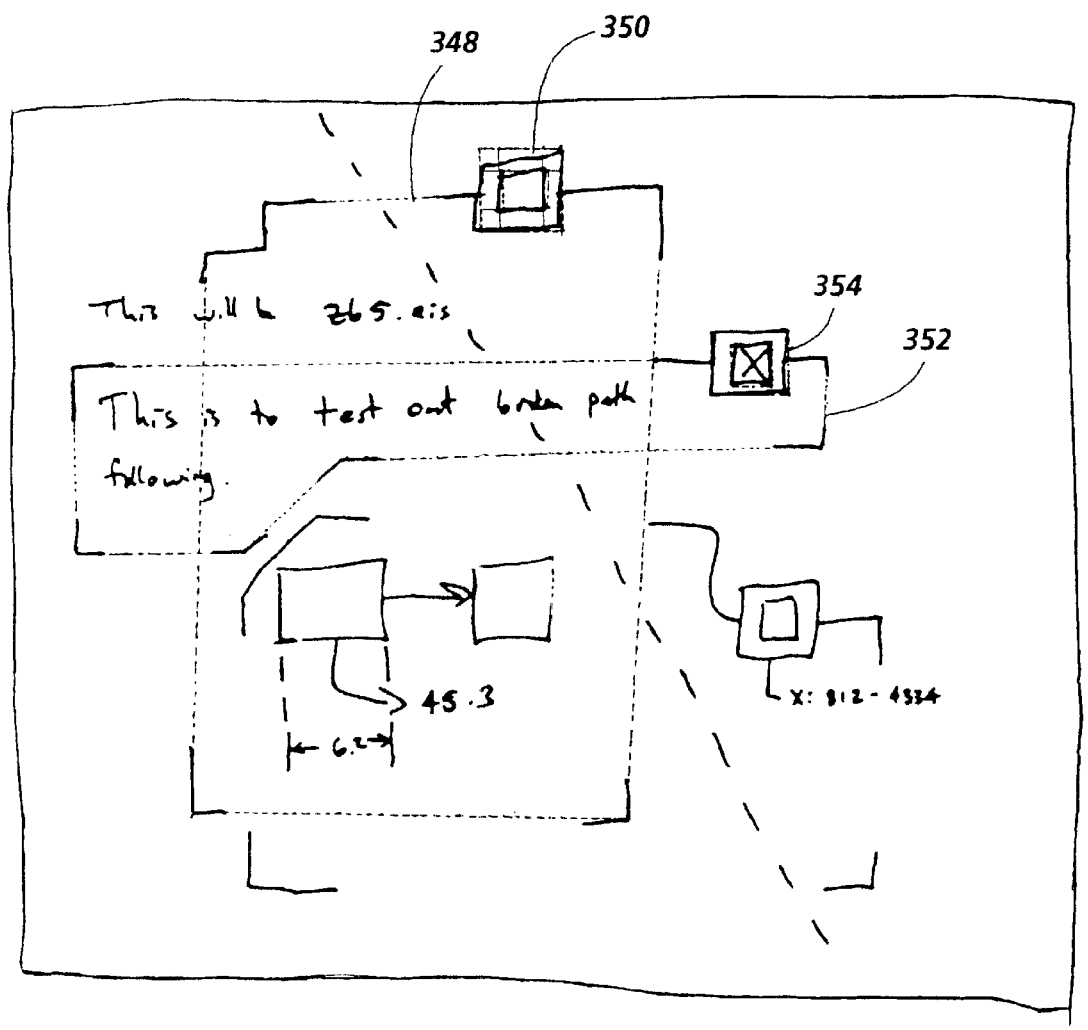

FIG. 33 shows the resultant NBB 350 and its associated spatial subregion, represented as polygon 348, determined by beam searching as described above. A second spatial subregion 352, associated with another NBB 354, may also be found using beam searching.

Figure 34:
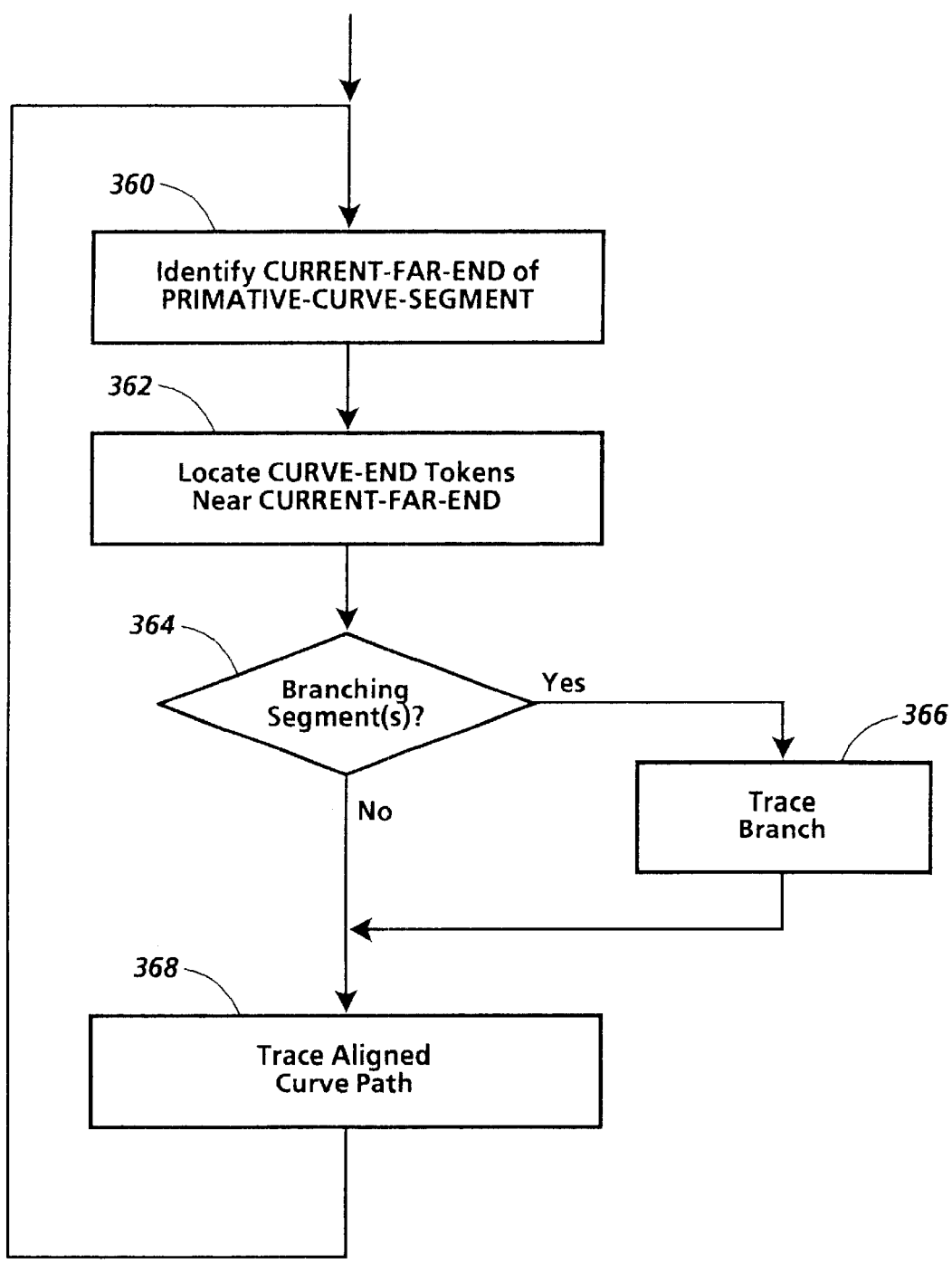
FIG. 34 is flowchart which shows steps for tracing of branching contours.

Tracing of branching contours, shown in the flowchart of FIG. 34, involves a simple modification of the simple contour tracing algorithm. In step 360 the CURRENT-FAR-END of the current PRIMITIVE-CURVE-FRAGMENT is identified. Step 362 locates CURVE-ENDs belonging to other PRIMITIVE-CURVE-FRAGMENTs near the CURRENT-FAR-END. Step 364 checks for suitably near and oriented CURVE-END tokens forming a branch off the current traced path, and a new independent trace of each branch is spawned in step 366 for however many are encountered, following the tracing steps as described in relation to FIG. 28. Step 338 continues tracing along the current traced path.

Such methods of tracing leads to the identification of locations in the image which are the beginning of a line of text. Then, text segmentation demarcates the region of the image containing the text. A method for segmenting text is described in U.S. patent application Ser. No. (D/94267Q), previously referenced. From this segmentation it is an easy matter to extract the corresponding region of the original bitmap image to send to a separate handwriting recognition module for recognition of the text.

F. Miscellaneous

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. A method of initiating an action of a computing device using a hand drawn command designator hand drawn on a surface that produces no output in electronic form, an electronic camera system capturing an image of a set of hand drawn marks on the surface to generate an electronic rendition of the surface, the set of hand drawn marks including the command designator a selection designator and other hand drawn marks, the method comprising:

a) analyzing the set of hand drawn marks represented by the electronic rendition of the surface to recognize the hand drawn command designator;

b) analyzing the set of hand drawn marks represented by the electronic rendition of the surface to recognize the presence on the surface of the hand drawn selection designator, the presence of the selection designator indicating selection of the action associated with the command designator; and c) initiating performance of the action by the computing device if the hand drawn selection designator is present.

2. The method of claim 1 wherein act a) comprises the sub-acts of:

a1) finding a first geometric symbol;

a2) finding a second geometric symbol, the second geometric symbol being included within a region of the first geometric symbol; and a3) creating a first symbolic token if the first and second geometric symbols are found, the first symbolic token representing electronically the hand drawn command designator.

3. The method of claim 1 wherein a act a) comprises the sub-acts of:

a1) creating a first instance of a subsymbol if analysis of the electronic rendition of the surface determines a first hand drawn mark, the first instance of the subsymbol representing the first hand drawn mark;

a2) creating a second instance of the subsymbol if analysis of the electronic rendition of the surface determines a second hand drawn mark. the second instance of the subsymbol representing the second hand drawn mark; and when the second instance of the subsymbol is in proximity to the first instance of the subsymbol:

A creating a first symbol if analysis of the electronic rendition of the surface determines a first set of hand drawn marks associated with the first instance of the subsymbol:

B creating a second symbol if analysis of the electronic rendition of the surface determines a second set of hand drawn marks associated with the second instance of the subsymbol;

C) creating a first symbolic token when the second symbol is nested within the first symbol, the first symbolic token representing the command designator.

4. The method of claim 1 wherein act b) further comprises the subact of:

b1) analyzing the electronic rendition of the surface to determine the proximity of the hand drawn selection designator to the first symbolic token.

5. The method of claim 1 further comprising:

d) analyzing the electronic rendition of the surface to determine a spatial area of the surface associated with the command designator and performing the action with respect to the spatial area.

6. The method of claim 5 wherein act d) comprises the subact of:

d1) analyzing the electronic rendition of the surface to determine curvilinear tokens associated the first symbolic token encompassing the spatial area of the surface.

7. The method of claim 6 wherein subact d1) comprises the subacts of:

A) analyzing the electronic rendition of the surface to determine a first curvilinear token, the first curvilinear token having a first end and a second end, the first end of the first curvilinear token being in contact with the first symbolic token;

B) extending a path of alignment of the first curvilinear token from the second end;

C analyzing the electronic rendition of the surface to determine a search area in a region of the surface surrounding the path of alignment; and D) analyzing the electronic rendition of the surface to determine a second curvilinear token in the search area substantially aligned with the first curvilinear token.

8. The method of claim 5 wherein act d) comprises the subact of:

d1) analyzing the electronic rendition of the surface to determine curvilinear tokens in close proximity to the first symbolic token, the curvilinear tokens also forming comers with other curvilinear token to encompass the spatial area of the surface.

9. The method of claim 5 wherein act d) comprises the subact of:

d1) analyzing the electronic rendition of the surface to determine a series of curvilinear tokens in contact with the first symbolic token at a first end, each of the curvilinear tokens being substantially aligned with other curvilinear tokens or forming a corner with other curvilinear tokens at a second end of the first symbolic token, the series of curvilinear tokens encompassing the spatial area of the surface.

10. A method for identifying a hand drawn command designator hand drawn on a surface that produces no output in electronic form, an electronic camera system capturing an image of a set of hand drawn marks on the surface to generate an electronic rendition of the surface, the set of hand drawn marks including the command designator and other hand drawn marks, the method comprising:
- a) determining a first geometric shape and a second geometric shape of the hand drawn command designator;
- b) analyzing the electronic rendition of the surface to find the first geometric shape; and
- c) analyzing the electronic rendition of the surface to find the second geometric shape nested within the first geometric shape.

11. The method of claim 10 wherein the first geometric shape and the second geometric shape are rectangular.

12. The method of claim 10 wherein act b) comprises the subacts of:
- b1) analyzing the electronic rendition of the surface to find a portion of the first geometric shape; and
- b2) analyzing the electronic rendition of the surface to find other portions of the first geometric shape associated with the portion of the first geometric shape; and wherein act c) comprises the subacts of:
- c1) analyzing the electronic rendition of the surface to find a portion of the second geometric shape in close proximity to the portion of the first geometric shape; and
- c2) analyzing the electronic rendition of the surface to find other portions of the second geometric shape associated with the portion of the second geometric shape.

13. The method of claim 10 wherein the first geometric shape is a rectangle, and the second geometric shape is another rectangle nested within said first geometric shape.

14. The method of claim 13 wherein act b) comprises the subacts of:
- b1) analyzing the electronic rendition of the surface to find all hand drawn lines in a region of the surface and creating a token to represent each hand drawn line found;
- b2) determining the tokens which form a upper left corner;
- b3) isolating tokens in a vicinity of the upper left corner; and
- b4) analyzing the isolated tokens in the vicinity of the upper left corner to find further corners representing an upper right corner, a lower right corner, and a lower left corner.

15. A method of initiating an action of a computing device using a hand drawn command designator hand drawn on a surface that produces no output in electronic form, an electronic camera system capturing an image including hand drawn marks on the surface to generate an electronic rendition of the surface, the method comprising:
- a) using spatial analysis of symbolic tokens to analyze the electronic rendition of the surface to recognize the hand drawn command designator;
- b) using spatial analysis of symbolic tokens to analyze the electronic rendition of the surface to determine the presence on the surface of a hand drawn selection designator, the presence of the selection designator indicating selection of the action associated with the command designator; and
- c) initiating performance of the action by the computing device if the hand drawn selection designator is present.

16. The method of claim 15 wherein act a) comprises the sub-acts of:
- a1) finding a first geometric symbol;
- a2) finding a second geometric symbol, the second geometric symbol being included within a region of the first geometric symbol; and
- a3) creating a first symbolic token if the first and second geometric symbols are found, the first symbolic token representing electronically the hand drawn command designator.

17. The method of claim 15 wherein act a) comprises the sub-acts of:
- a1) creating a first instance of a subsymbol if analysis of the electronic rendition of the surface determines a first hand drawn mark, the first instance of the subsymbol representing the first hand drawn mark;
- a2) creating a second instance of the subsymbol if analysis of the electronic rendition of the surface determines a second hand drawn mark, the second instance of the subsymbol representing the second hand drawn mark; and when the second instance of the subsymbol is in proximity to the first instance of the subsymbol:
- A) creating a first symbol if analysis of the electronic rendition of the surface determines a first set of hand drawn marks associated with the first instance of the subsymbol;
- B) creating a second symbol if analysis of the electronic rendition of the surface determines a second set of hand drawn marks associated with the second instance of the subsymbol;
- C) creating a first symbolic token when the second symbol is nested within the first symbol, the first symbolic token representing the command designator.

18. The method of claim 15 wherein act b) further comprises the subact of:
- b1) analyzing the electronic rendition of the surface to determine the proximity of the hand drawn selection designator to the first symbolic token.

19. The method of claim 15 further comprising:
- d) analyzing the electronic rendition of the surface to determine a spatial area of the surface associated with the command designator and performing the action with respect to the spatial area.

20. The method of claim 19 wherein act d) comprises the subact of:
- d1) analyzing the electronic rendition of the surface to determine curvilinear tokens associated the first symbolic token encompassing the spatial area of the surface.

21. The method of claim 20 wherein subact d1) comprises the subacts of:
- A) analyzing the electronic rendition of the surface to determine a first curvilinear token, the first curvilinear token having a first end and a second end, the first end of the first curvilinear token being in contact with the first symbolic token;
- B) extending a path of alignment of the first curvilinear token from the second end;
- C analyzing the electronic rendition of the surface to determine a search area in a region of the surface surrounding the path of alignment; and D) analyzing the electronic rendition of the surface to determine a second curvilinear token in the search area substantially aligned with the first curvilinear token.

22. The method of claim 19 wherein act d) comprises the subact of:
   d1) analyzing the electronic rendition of the surface to determine curvilinear tokens in close proximity to the first symbolic token, the curvilinear tokens also forming corners with other curvilinear token to encompass the spatial area of the surface.

23. The method of claim 19 wherein act d) comprises the subact of:
   d1) analyzing the electronic rendition of the surface to determine a series of curvilinear tokens in contact with the first symbolic token at a first end, each of the curvilinear tokens being substantially aligned with other curvilinear tokens or forming a corner with other curvilinear tokens at a second end of the first symbolic token, the series of curvilinear tokens encompassing the spatial area of the surface.

24. A method for identifying a hand drawn command designator hand drawn on a surface that produces no output in electronic form, an electronic camera system capturing an image of hand drawn marks on the surface to generate an electronic rendition of the surface, the method comprising:
   a) determining a first geometric shape and a second geometric shape of the hand drawn command designator;
   b) using spatial analysis of symbolic tokens to analyze the electronic rendition of the surface to find the first geometric shape; and
   c) using spatial analysis of symbolic tokens to analyze the electronic rendition of the surface to find the second geometric shape nested within the first geometric shape.

25. The method of claim 24 wherein the first geometric shape and the second geometric shape are rectangular.

26. The method of claim 24 wherein act b) comprises the subacts of:
   b1) analyzing the electronic rendition of the surface to find a portion of the first geometric shape; and
   2) analyzing the electronic rendition of the surface to find other portions of the first geometric shape associated with the portion of the first geometric shape; and wherein act c) comprises the subacts of:
   c1) analyzing the electronic rendition of the surface to find a portion of the second geometric shape in close proximity to the portion of the first geometric shape; and
   c2) analyzing the electronic rendition of the surface to find other portions of the second geometric shape associated with the portion of the second geometric shape.

27. The method of claim 24 wherein the first geometric shape is a rectangle, and the second geometric shape is another rectangle nested within said first geometric shape.

28. The method of claim 24 wherein act b) comprises the subacts of:
   b1) analyzing the electronic rendition of the surface to find all hand drawn lines in a region of the surface and creating a token to represent each hand drawn line found;
   2) determining the tokens which form an upper left corner;
   3) isolating tokens in a vicinity of the upper left corner; and
   4) analyzing the isolated tokens in the vicinity of the upper left corner to find further corners representing an upper right corner, a lower right corner, and a lower left corner.

* * * * *